PULSE CODE MODULATION COMMUNICATION SYSTEM

Original Filed Oct. 30, 1947 13 Sheets-Sheet 1

INVENTOR
R. L. CARBREY
BY George C. Lord
ATTORNEY

PULSE CODE MODULATION COMMUNICATION SYSTEM

Original Filed Oct. 30, 1947

13 Sheets-Sheet 2

INVENTOR
R. L. CARBREY
BY George C. Lord
ATTORNEY

April 21, 1953 R. L. CARBREY 2,636,159

PULSE CODE MODULATION COMMUNICATION SYSTEM

Original Filed Oct. 30, 1947 13 Sheets-Sheet 3

INVENTOR
R. L. CARBREY
BY George C. Lord
ATTORNEY

PULSE CODE MODULATION COMMUNICATION SYSTEM

Original Filed Oct. 30, 1947 13 Sheets-Sheet 4

INVENTOR
R. L. CARBREY
BY
[signature]
ATTORNEY

PULSE CODE MODULATION COMMUNICATION SYSTEM

Original Filed Oct. 30, 1947 13 Sheets-Sheet 5

INVENTOR
R. L. CARBREY
BY George C. Tork
ATTORNEY

INVENTOR
R. L. CARBREY
BY George C. Lord
ATTORNEY

April 21, 1953 R. L. CARBREY 2,636,159

PULSE CODE MODULATION COMMUNICATION SYSTEM

Original Filed Oct. 30, 1947 13 Sheets-Sheet 7

INVENTOR
R. L. CARBREY
BY George C. Lord
ATTORNEY

April 21, 1953 R. L. CARBREY 2,636,159

PULSE CODE MODULATION COMMUNICATION SYSTEM

Original Filed Oct. 30, 1947 13 Sheets-Sheet 8

INVENTOR
BY R. L. CARBREY
George C. Lord
ATTORNEY

PULSE CODE MODULATION COMMUNICATION SYSTEM

Original Filed Oct. 30, 1947 13 Sheets-Sheet 9

INVENTOR
R. L. CARBREY
BY George C. Lord
ATTORNEY

April 21, 1953 R. L. CARBREY 2,636,159

PULSE CODE MODULATION COMMUNICATION SYSTEM

Original Filed Oct. 30, 1947 13 Sheets-Sheet 10

INVENTOR
R. L. CARBREY
BY George C. Tork
ATTORNEY

April 21, 1953 R. L. CARBREY 2,636,159
PULSE CODE MODULATION COMMUNICATION SYSTEM
Original Filed Oct. 30, 1947 13 Sheets-Sheet 11

INVENTOR
R. L. CARBREY
BY George C. Lord
ATTORNEY

April 21, 1953 R. L. CARBREY 2,636,159

PULSE CODE MODULATION COMMUNICATION SYSTEM

Original Filed Oct. 30, 1947 13 Sheets-Sheet 12

INVENTOR
R.L. CARBREY
BY George C. Ford
ATTORNEY

INVENTOR
R.L. CARBREY
BY George C. Lord
ATTORNEY

Patented Apr. 21, 1953 2,636,159

UNITED STATES PATENT OFFICE 2,636,159

PULSE CODE MODULATION COMMUNICATION SYSTEM

Robert L. Carbrey, Madison, N. J., assignor to Bell Telephone Laboratories, Incorporated, New York, N. Y., a corporation of New York Original application October 30, 1947, Serial No. 783,187, now Patent No. 2,610,295, dated September 9, 1952. Divided and this application April 12, 1951, Serial No. 220,695

7 Claims. (Cl. 332—11)

Figure 2:
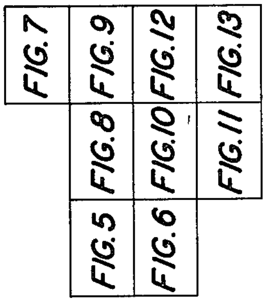

This invention relates to coding devices for communication systems employing pulse code modulation and is a division of my copending patent application Serial No. 783,187, filed October 30, 1947, now Patent 2,610,295, September 9, 1952.

In communication systems utilizing what is known as pulse code transmission, a speech wave or other signal to be transmitted is sampled periodically to ascertain its instantaneous amplitude. The measured instantaneous amplitude is expressed by pulse codes analogous to telegraph codes.

One code which conveniently may be employed in pulse code transmission involves permutations of a fixed number of code elements each of which may have any one of several conditions or values. An advantageous code of this type is the so-called binary code in which each of the fixed number of code elements may have either of two values. One advantageous way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2^n$ where $n$ is the number of code elements employed.

Because the total number of different amplitudes which may be represented by such a code of a fixed number of elements is limited, it is found desirable to divide the continuous range of amplitude values of which the transmitted signal is capable into a fixed number of constitutent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted.

It will be observed that each code element in one of its values represents the presence in sampled amplitude of a particular fixed portion of the total amplitude range, while in the other value it represents the absence of that same portion.

The groups of code pulses representing the successive sample amplitudes of the signal wave may be transmitted over a communication link to a remote station and employed thereat to reproduce or control the regeneration of the complex signal wave to which they correspond. It is usual in order to obtain the maximum utilization of such a communication link to employ a single link for transmission of a plurality of different messages by the use of the time division multiplex principle. In accordance with this principles, the messages in a plurality of channels are sampled, code groups of pulses corresponding to the sample amplitudes for each channel are generated and are transmitted in turn either in sequence or interleaved over the same communication link.

Objects of the present invention are to provide simplified coding circuits capable of high speed operation and generally to improve the reliability of the component circuits of pulse code modulation communication equipment.

In accordance with the invention, coding circuits are provided in which networks of resistors and constant current devices are employed to produce code groups in response to an applied amplitude sample.

Figure 1:
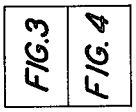
Figure 14:
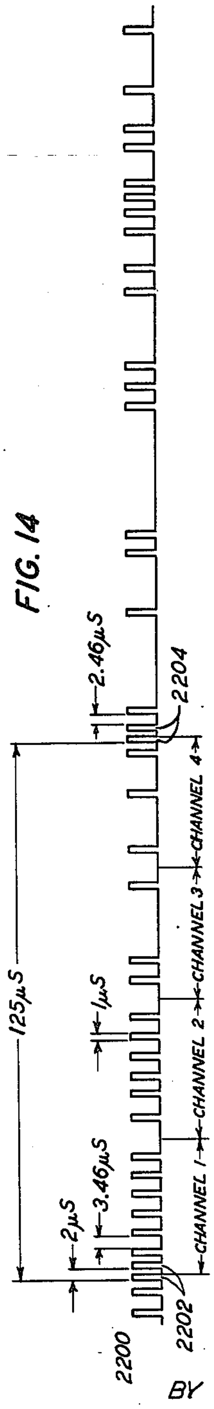
Figure 3:
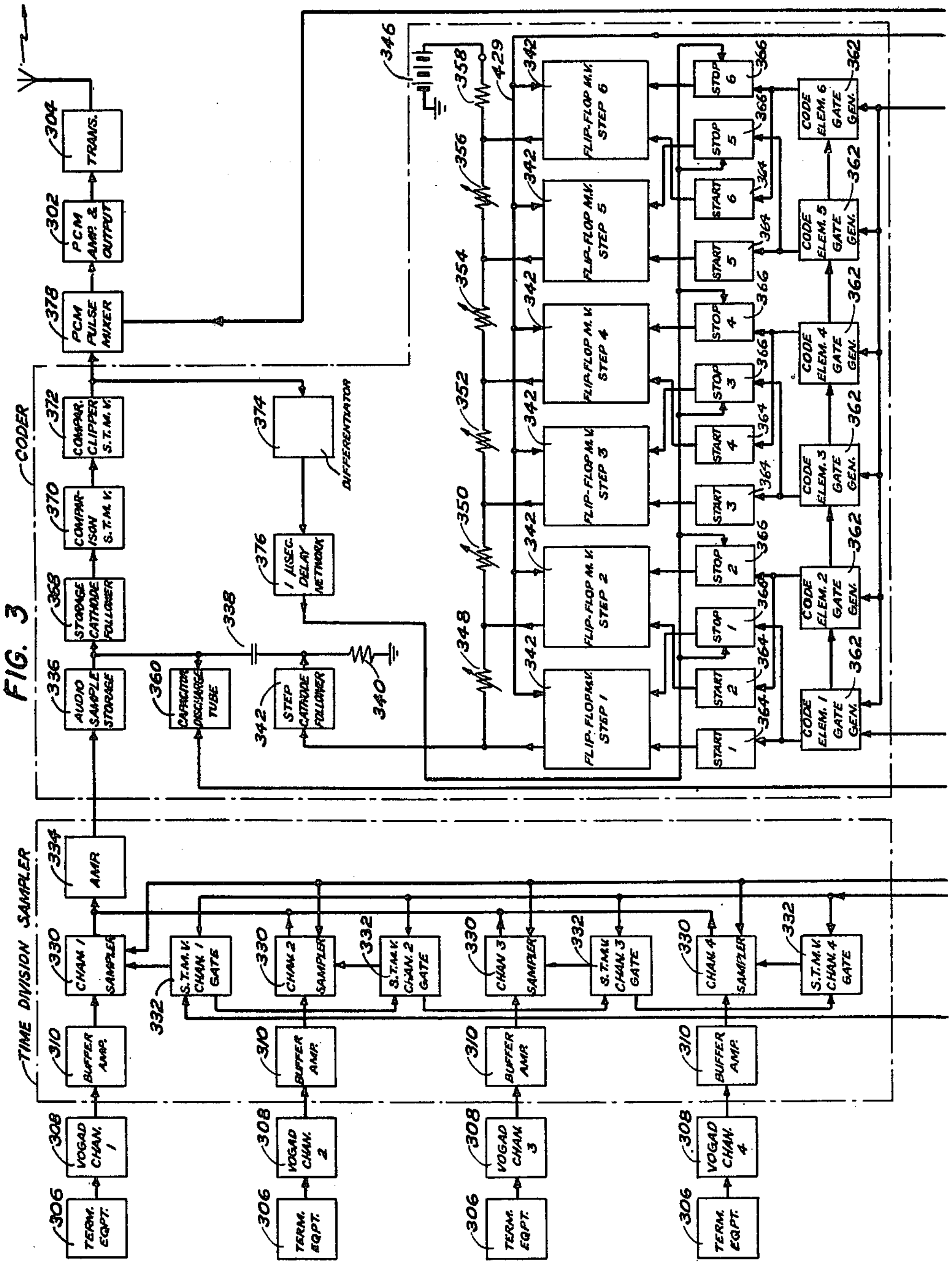
Figure 4:
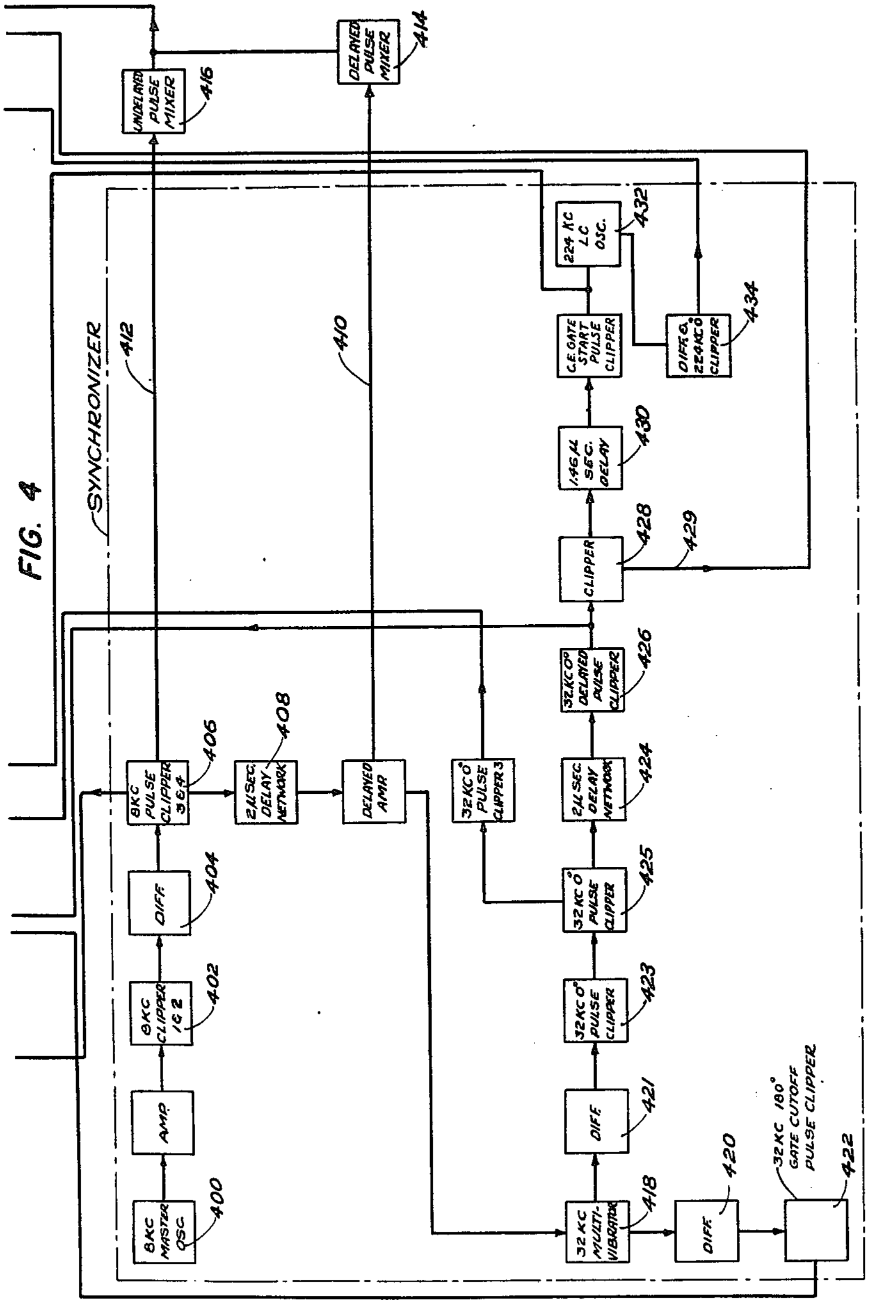
Figure 5:
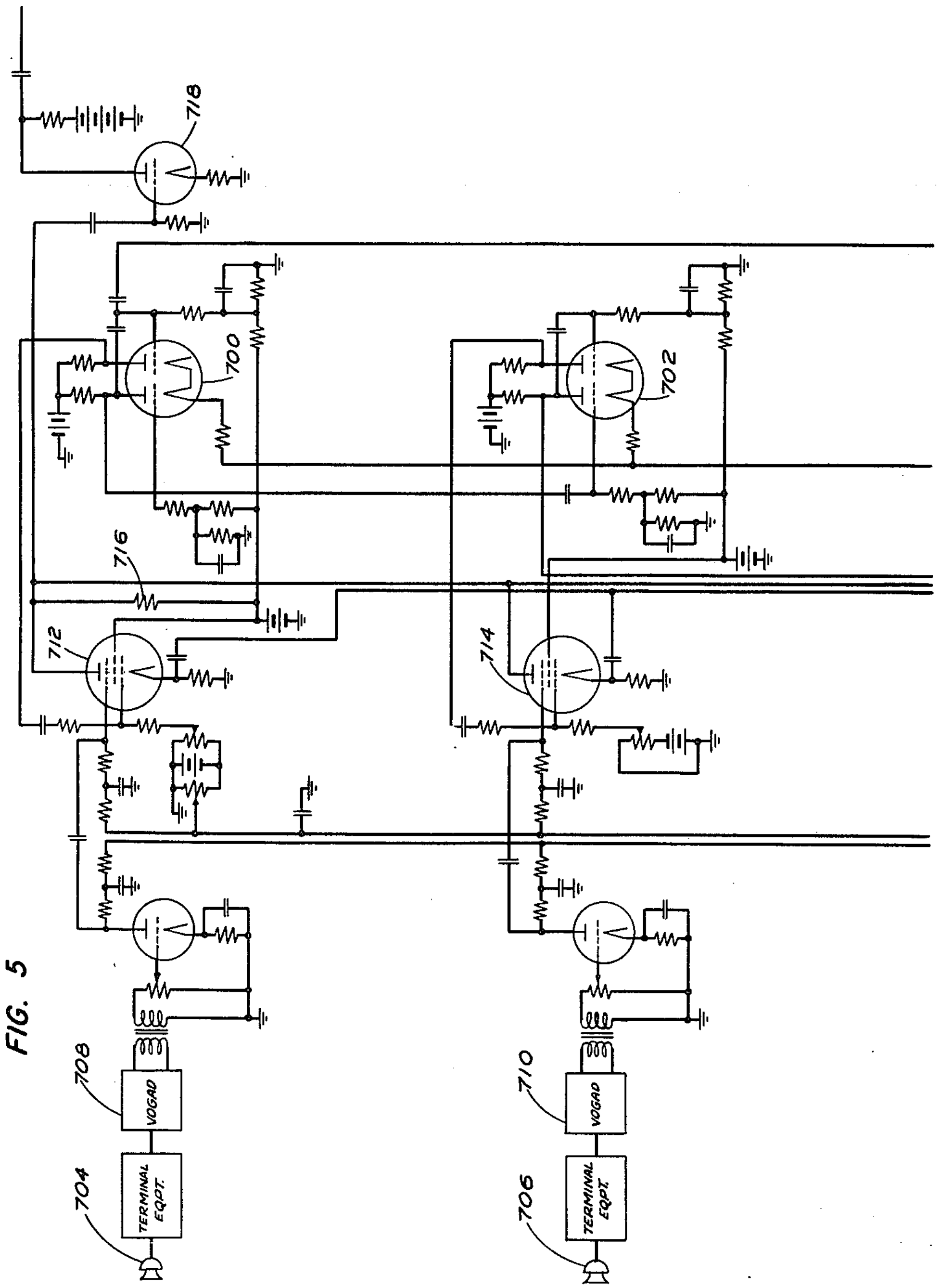
Figure 6:
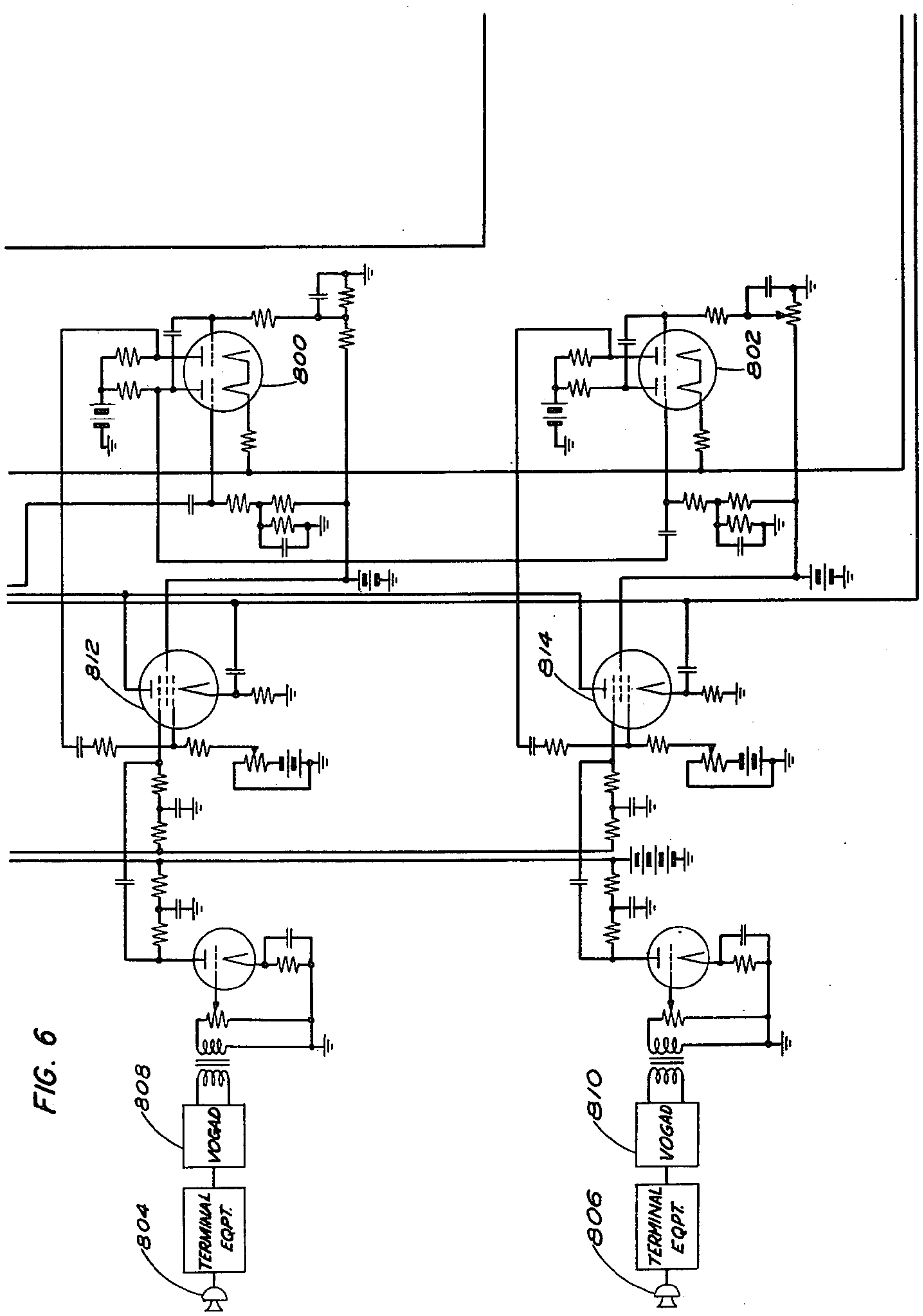
Figure 7:
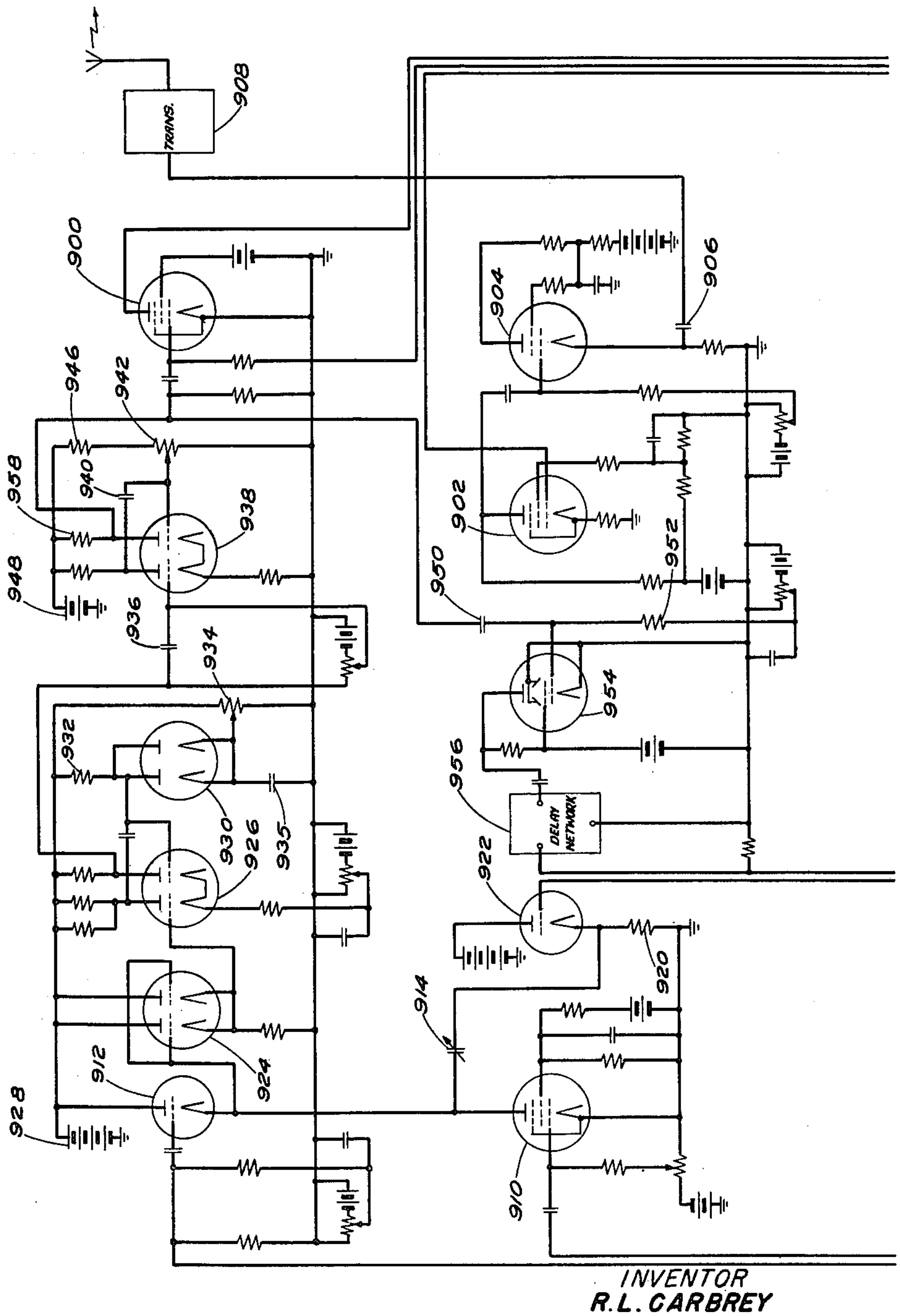
Figure 8:
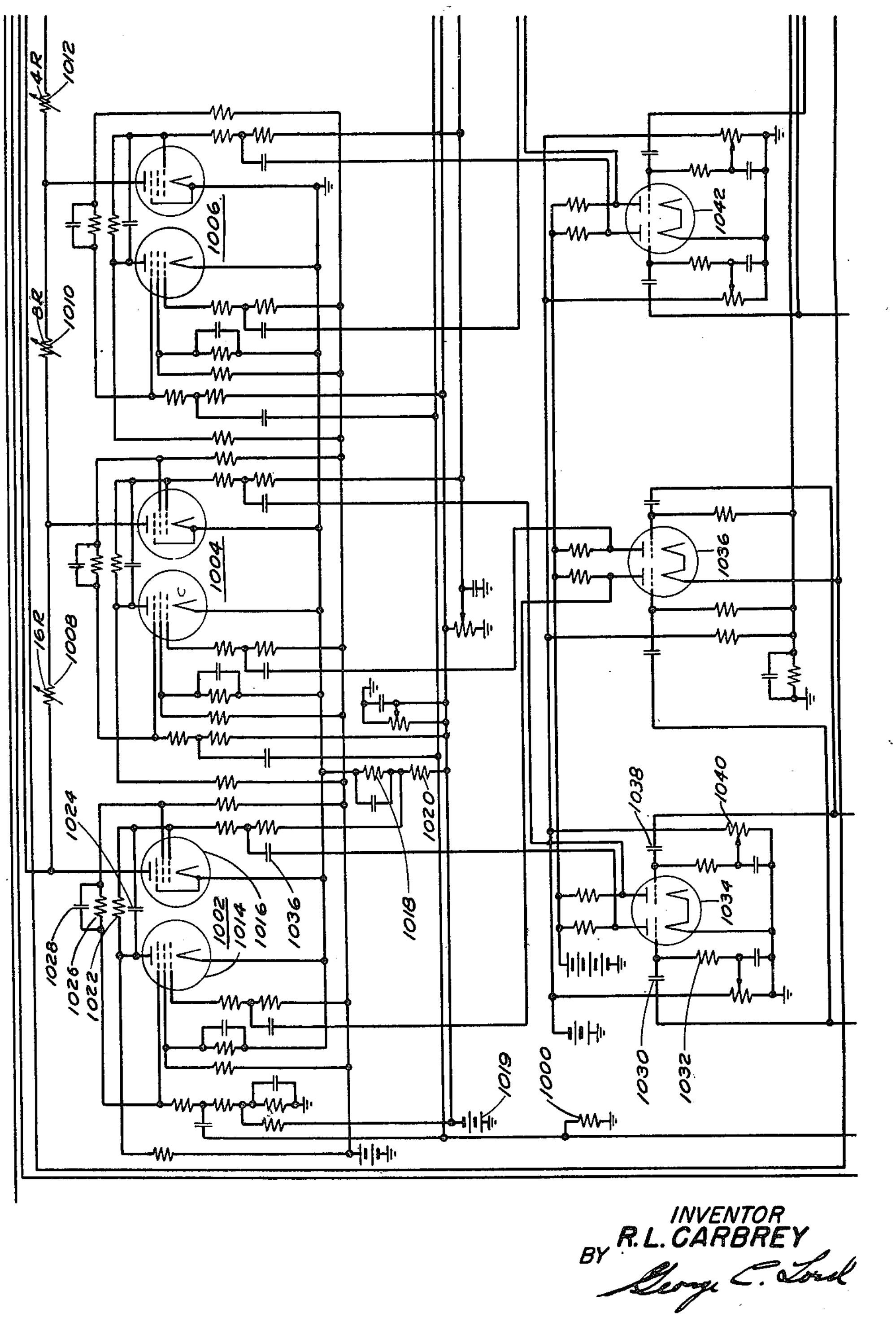
Figure 9:
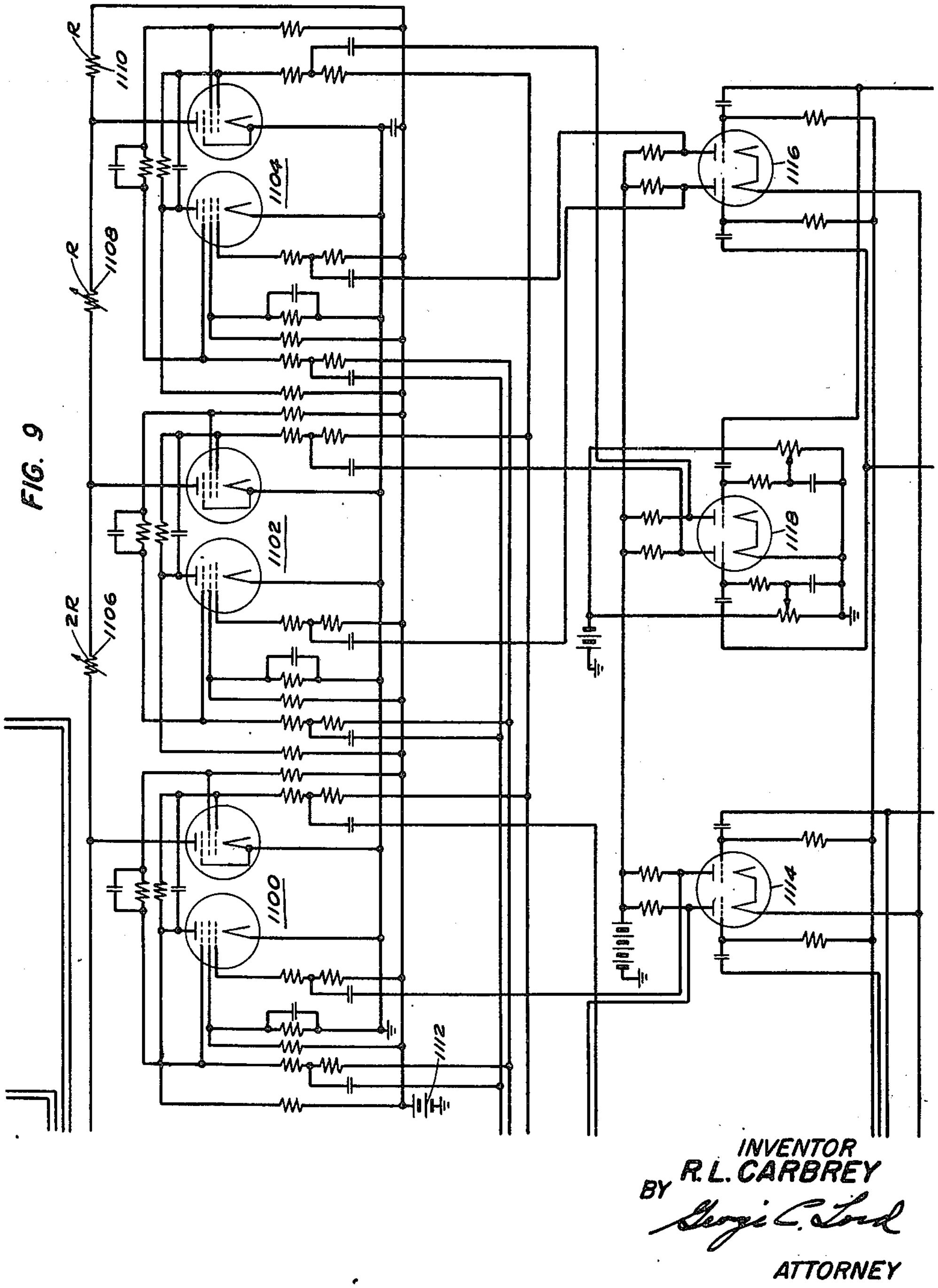
Figure 15:
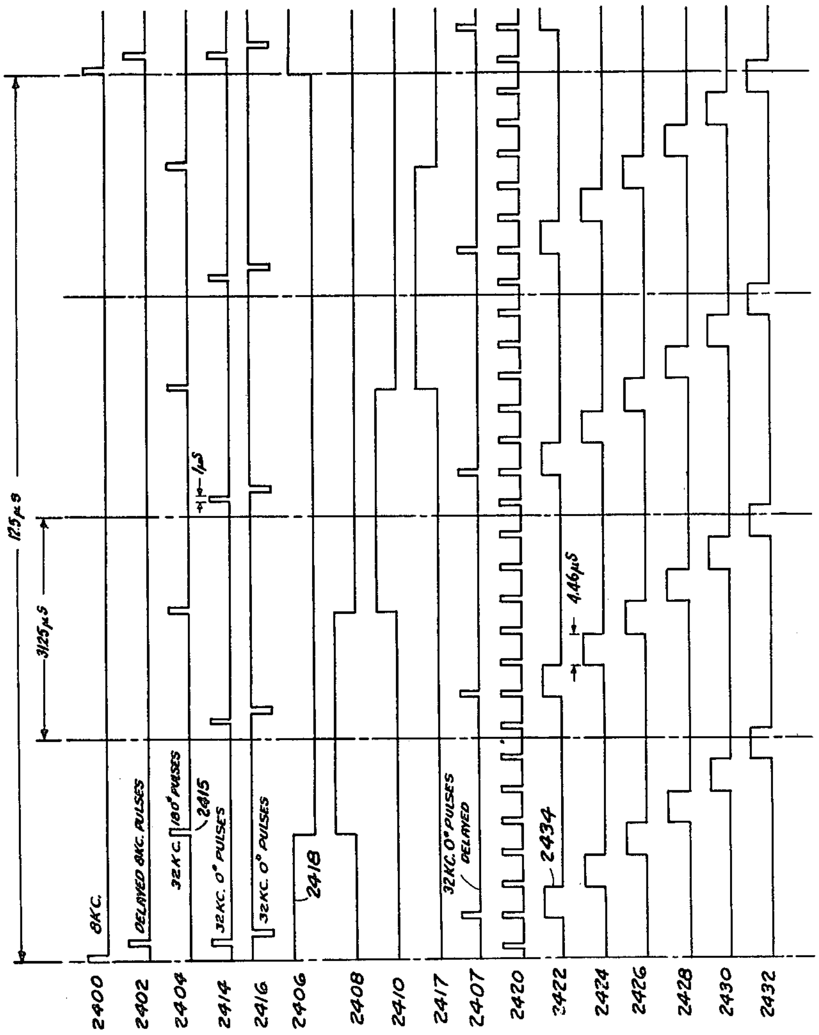

The above and other features of the invention, will be described in detail in the following specification taken in connection with the drawings in which:

Figs. 1 and 2 are diagrams showing the manner in which Figs. 3 and 4 and Figs. 5 through 13, respectively, may be arranged to show details of the present invention;

Figs. 3 and 4, when arranged as shown in Fig. 1 comprise a schematic block diagram of the transmitting station of a pulse code modulation system in accordance with the invention;

Figs. 5 through 13, when arranged as shown in Fig. 2, form a schematic circuit diagram of the system shown in the block diagram of Figs. 3 and 4; and Figs. 14 and 15 are graphs of wave forms appearing in various portions of the pulse code modulation system of the invention.

In the illustrative system described herein, provision is made for the accommodation of four message channels and a six-unit binary code is employed. Assuming that each of the four channels is to be employed for the transmission of speech, it is sufficient to sample each channel at a sampling rate of 8,000 samples per second. Accordingly, the complete multiplex frame comprising one code group for each channel occupies 125 microseconds. This interval is divided into four equal periods, allowing 31.25 microseconds for each channel. Each of the 31.25-microsecond channel periods is divided into seven 4.46-microsecond intervals. The first of these intervals is employed for the transmission of a synchronizing signal when required and the remaining six intervals correspond to the denominational orders of the six-element binary code, each of these denominational orders being represented by a pulse or by the absence of a pulse as required according to the code representation of the amplitude of the message sample applied to that channel.

Ordinarily it is sufficient to transmit a synchronizing signal only once for each frame. In the present system this signal is transmitted at the beginning of the frame in the first 4.46-microsecond interval of the first channel and the initial 4.46-microsecond intervals of the remaining three channels are left unused. The synchronizing signal employed in the system of the present invention may comprise two pulses of the same duration as the code element pulses separated by an interval equal to the duration of a code element pulse. This particular type of synchronizing signal is chosen because it may be employed in systems having radio transmitters capable of generating only one kind of output pulse. Thus, both synchronizing and code element pulses may conveniently be one-microsecond pulses, the separation of the synchronizing signal from the code element signals being effected at the receiver by means to be described hereinafter.

Graph 2200 in Fig. 14 is a representation of several frames of a typical pulse code signal as transmitted over the system. The synchronizing pulses for the first frame appear at 2202 and those of the second frame at 2204. It will be noted that in this graph the pulse codes for each of the four channels are shown as representing different sample amplitudes, the number of code element pulses present in the code group for each channel being dependent upon the instantaneous amplitude of the message signal applied to that channel. It will further be noted that in the second frame the sample amplitudes for the messages in each of the four channels having changed, resulting changes have been produced in the arrangements of the pulses of the four code groups.

The general arrangement of the synchronizing system elements at the transmitter is shown in the block diagram comprising Figs. 3 and 4 of the drawings arranged as indicated in Fig. 1. Essentially the synchronizing system comprises an 8-kilocycle master oscillator 400 located at the transmitter and arranged to control as a slave a similar 8-kilocycle oscillator at the receiver, through control circuits utilizing double synchronizing pulses transmitted at the beginning of each frame of the multiplex signal.

For the purpose of generating these double synchronizing pulses, the 8-kilocycle sinusoidal output wave of master oscillator 400 at the transmitter is amplified and applied to clipper stages 402 which transform the sinusoidal wave into a square wave of the same fundamental frequency. This square wave is applied to a differentiator 404 and the positive pulses corresponding to the leading edges of the positive half cycles of the square wave are acted upon by clipper stages 406 to obtain 1-microsecond pulses. The output of clipper stages 406 is applied to two different paths in one of which the successive 1-microsecond pulses are passed through a 2-microsecond delay network 408. The delayed pulses from network 408 are amplified and appear on conductor 410, while the undelayed pulses from the other output of clipper stages 406 appear on conductor 412. The delayed and undelayed pulses are applied, respectively, to the delayed and undelayed pulse mixers 414 and 416 by which they are combined and the double synchronizing pulses so obtained are combined with the code element pulses from coding equipment to be described hereinafter. The composite multiplex signal, comprising the synchronizing and code element pulses combined in the proper time relationship, is applied through an amplifier 302 to the interstation transmission means which may be a transmission line or as shown herein, a radio transmitter 304. The time relationship between the various pulses is determined by timing circuits driven by master oscillator 400 which control the operation of the coding equipment in such fashion that the double synchronizing pulses occur in the frame in the time position shown in graph 2200 of Fig. 14.

The output waves from oscillator 400 at the transmitter are employed to coordinate the operation of the message transmitting portions of the system. Briefly the message transmitting equipment includes a time division multiplex unit for sampling the message signals in each of a plurality of input channels in turn and applying a sample signal for each channel to coding equipment which is arranged to produce for each sample a pulse code group representative of the amplitude thereof. At the completion of the coding operation the output of the coder is applied to radio frequency equipment for transmission to the receiver. The various elements of the system referred to above will now be considered in more detail.

*Transmitting equipment*

In the illustrative system shown in Figs. 3 and 4, referred to above, provision is made for four separate message channels. In each of these channels, the message is applied to terminal equipment 306, which may include transducers, suitable level adjusting devices and impedance transforming circuits and the like.

It will be understood that the number of code elements employed to cover a given volume range is determinative of the granularity of reproduction of the message signals. Accordingly, it is not desirable to transmit extremely wide volume range signals using code groups having a relatively small number of code elements. This limitation can be reduced through the use of some method of volume compression. If as contemplated in the case of the system described herein, the system is to be employed only for voice communication, the required reduction of volume range may be obtained through the use of circuits known as voice operated gain adjusting devices or vogads. Such vogads are well known in the art, a typical device of this type being shown in the sole figure of Patent 2,152,709 to L. Schott, April 4, 1939. If it is desired to transmit music over the system some form of controlled compression at the transmitter and expansion at the receiver may be used.

In the illustrative system, a vogad 308 is provided at the transmitter for each message channel. The outputs of the four vogads are applied through buffer amplifiers 310 to a time division multiplex distributor. This distributor samples each of the four channels in turn and applies the sample signals in turn to a common output circuit. Conveniently, the distributor is also arranged effectively to add a direct-current component to the input message signals. This component may have an amplitude equal to at least one-half the total possible range of amplitudes to be accepted by the system. Accordingly, all signals appearing in the common output circuit will be of positive polarity. As shown herein the distributor comprises four sampler units 330 and certain control equipment. Each of these sampler units 330 may comprise a gated vacuum tube which is arranged to produce an output representative of the input signal applied thereto only when suitably enabled by auxiliary equipment. As arranged in the present system each of the audio sampler units 330 will produce an output only when there is coincidence between a channel input signal, a channel gate signal and an enabling pulse.

The channel gate signals are produced and applied to the four audio samplers in turn by a gate distributor which may conveniently be of the type disclosed in the copending application Serial No. 646,455, filed February 8, 1946, in the name of L. A. Meacham now Patent No. 2,486,491, November 1, 1949. In this gate distributor four single-trip multivibrators 332, each having a natural period equal to slightly more than one channel period are connected in a chain circuit. The first of these multivibrators is triggered by an 8-kilocycle pulse of 1-microsecond duration obtained from pulse clipper 406 of the synchronizing equipment. The single square pulses in the output of each of the single trip multivibrators of the gate distributor are precisely terminated through the use of gate cut-off pulses occurring at the rate of 32 kilocycles per second obtained from the synchronizing equipment shown in Fig. 4. For this purpose, the delayed 8-kilocycle pulses from delay network 408 are employed to trigger a 32-kilocycle multivibrator 418. Two square wave outputs 180° out of phase are taken from multivibrator 418, and applied through differentiators 420 and 421 respectively, to clippers 422 and 423 to obtain two series of positive pulses. For the sake of convenience, these two series of pulses will be referred to hereafter as 32-kilocycle 180° pulses and 32-kilocycle 0° pulses respectively. The 32-kilocycle 180° pulses are applied to all of the single trip multivibrators 332 in parallel. These pulses serve to cut off the multivibrator which is producing a gate pulse at the time of application and thus to initiate the operation of the multivibrator which is to form the gate pulse for the next succeeding channel.

Referring now to Fig. 15, the 8-kilocycle pulses which initiate the operation of the chain circuit of the gate distributor are shown at 2400. The delayed 8-kilocycle pulses from delay network 408 are shown at 2402 while the 32-kilocycle 180° output pulses from clipper 422 are shown at 2404. The single square wave output signals from single trip multivibrators 332 are shown by graphs 2406 through 2410 and 2417. The first single trip multivibrator 332 of the chain produces the output wave shown in graph 2406. The trailing edge of the single square pulse is accurately located by the first 32-kilocycle 180° cut-off pulse 2415 of graph 2404. It will be noted that the termination of the gate pulse of graph 2406 occurs simultaneously with the initiation of the gate pulse for graphs 2408, etc. Thus it will be recognized that gate pulses are applied to each of the four samplers 330 in turn.

It will be recalled that samplers 330 produce an output only when a message signal, a gate pulse and an enabling pulse are applied thereto simultaneously. Accordingly a series of enabling pulses occurring at a repetition rate of 32 kilocycles per second is applied to all of the samplers in parallel, the pulses of this series being timed to occur during the 8-kilocycle gate pulses. At any particular time only the sampler 332 which is in receipt of a channel gate pulse is enabled by the 32-kilocycle enabling pulses to produce an output signal, the amplitude of which is proportional to that of the message signal applied to the associated terminal equipment. The necessary 32-kilocycle enabling pulses are obtained from clipper 425. The pulses from clipper 425, shown in graph 2414, are applied to a 2-microsecond delay network 424, the delayed pulses from which are shaped by a clipper 426 to obtain the pulses shown in graph 2416 of Fig. 24. The parallelled outputs of the four samplers are applied through an amplifier 334 to the coding equipment.

Briefly, the coding equipment is arranged to perform in the following manner. First, the sample obtained from the common output of the samplers 330 and representative of the instantaneous amplitude of the message signal in one of the four channels is stored for the duration of a coding cycle. Subsequently, voltage steps corresponding respectively to $\frac{1}{2}$, $\frac{1}{4}$, $\frac{1}{8}$, $\frac{1}{16}$, $\frac{1}{32}$ and $\frac{1}{64}$ of the total amplitude range to be accommodated by the system are successively added to the stored sample. After the addition of each step the sum of the stored sample and the voltage step or steps added thereto is compared with a reference voltage equal to the maximum amplitude range to be accommodated. If the summation voltage is greater than the reference voltage a code element pulse is produced for transmission. Upon the production of a code element pulse, the voltage step which was last added to the stored sample to produce the pulse is removed from the summation. If on the other hand, the summation voltage is less than the reference voltage no pulse is produced. In either event, the next voltage step is then applied and is added to the stored sample (plus any preceding steps which were not of sufficient amplitude to cause production of a code element pulse). The comparison operation is repeated, etc.

Considered in more detail the coding operation is carried out as follows. First, voltage step one which is equal in amplitude to one-half the maximum peak-to-peak signal to be accommodated by the system is added to the stored sample. It will be recalled that a bias voltage was added to each of the message signals in the sampling equipment to make all signal voltages positive. Accordingly, the maximum peak-to-peak input signal corresponds to the maximum amplitude range of the coder. If the stored sample happens to be of amplitude less than one-half the maximum peak-to-peak amplitude, the summation of the stored sample and the first step signal does not exceed the reference voltage and no code element pulse will be produced. If on the other hand the signal is greater than one-half the maximum peak-to-peak amplitude a code element pulse will be produced and the first step signal will be removed leaving only the stored sample.

Next, the second voltage step corresponding to one-fourth of the maximum peak-to-peak amplitude is added to the stored signal plus the first step, if present. If the amplitude of the stored sample is less than one-fourth the maximum peak-to-peak amplitude the summation of the stored sample, the first step of one-half amplitude and the second step of one-fourth amplitude will remain less than the reference voltage. Accordingly, no code element pulse will be produced and the second step will remain. If on the other hand, the stored sample is greater than one-fourth but less than one-half the total peak-to-peak amplitude, a code element pulse will be produced since the summation of the message signal and the first two steps, that is, the one-half and the one-fourth amplitude steps will exceed the reference voltage.

This process is repeated for each of the smaller steps, each step corresponding to and controlling production of a digit in one of the denominational orders of the binary code group to be produced at the output of the coding equipment.

Equipment for performing the operations outlined above is shown in block form in Fig. 3. The message signal sample from the multiplex distributor is applied to a sample storage device 336 comprising a cathode follower tube the cathode circuit of which includes a storage capacitor 338 and the cathode resistor 340 of a second cathode follower 342 through which the voltage steps referred to above are applied for addition to the stored sample.

These voltage steps are produced by a series of gated flip-flop multivibrators 342, one of these multivibrators being provided for each denominational order of the binary code groups to be produced. These flip-flop multivibrators are double-stability circuits each of which may be triggered to either of its conditions of stability and caused to remain in that condition until again triggered. For convenience of description, one of the two conditions of stability for each circuit is identified as the "on" condition while the other is identified as the "off" condition. When these step multivibrators are in the "off" condition, current for the conducting tubes of the six flip-flop step multivibrators is obtained from a common supply 346. Thus, when the step multivibrators are in the "off" condition, constant currents are drawn from this supply through a summation network comprising series resistors 348, 350, 352, 354, 356 and 358, which have respectively ohmic values of 16R, 8R, 4R, 2R, R and R, where the voltage drop across R is made 1/64 the total peak-to-peak amplitude range to be accommodated. Thus the resistance loads through which the multivibrators for steps 1 through 6 draw current when in the "off" condition are respectively 32R, 16R, 8R, 4R, 2R and R and the voltage steps produced by switching the several multivibrators to the "on" condition are ½, ¼, ⅛, 1/16, 1/32 and 1/64 the total amplitude to be accommodated.

Initially, all of the step multivibrators are switched to the "off" condition and the steps are switched "on" one a at time in the course of the coding process. The terminal of the summation network remote from source 346 is connected to step cathode follower 342, applying thereto a voltage equal to that of the source 346 minus the drop in the summation network.

Prior to the beginning of a coding operation the sample storage capacitor is discharged to remove any residual charge which is present therein and the six step multivibrators are triggered to the "off" condition. These initial conditions are produced by restoration and reset pulses obtained from the synchronizing circuits. A 32-kilocycle 0° pulse derived from clipper 425 is applied to a capacitor discharge tube 360, which is connected across the sample storage capacitor 338. This 32-kilocycle 0° pulse, renders the discharge tube conductive to furnish a discharge path for the storage capacitor.

Two microseconds later the step multivibrators are restored to the "off" condition. For this purpose a 32-kilocycle 0° pulse from the output of 2-microsecond delay network 424 is applied through clippers 426 and 428 to obtain a series of negative pulses, which are applied through lead 429 in parallel to all of the step multivibrators 342. Such negative pulses trigger all of the multivibrators to the "off" condition.

The operation of the coder to produce a code group of pulses corresponding to the instantaneous amplitude of the message signal in the first channel will now be considered. As stated above, all of the samplers 330 are enabled by the delayed 32-kilocycle 0° pulses shown in graph 2416. At the time of the first 32-kilocycle 0° pulse, however, only the sampler for channel 1 will be in receipt of the gate pulse necessary to permit the passage of a message signal therethrough, the gate pulse in this case being that shown at 2418 in graph 2406 (Fig. 15). As a result a voltage which is a measure of the instantaneous amplitude of the message signal in channel 1 is applied to and is stored in capacitor 338 at the time of occurrence of the enabling pulse. 1.46 microseconds later the first flip-flop multivibrator 342 is turned "on" to produce voltage step 1, which represents one-half the total amplitude range. This and the other step multivibrators are controlled by a gate distributor which is similar in all respects to the channel gate distributor described above. This distributor comprises six gate generators 362, one generator being provided for each of the six step multivibrators 342. The distributor is set in operation by delayed 32-kilocycle 0° pulses. These pulses are obtained from the output of restoration pulse clipper 428 and are further delayed 1.46 microseconds by a delay network 430. These delayed pulses are shown in graph 2407. The first gate generator is turned off and the second one on, etc. by a train of 224-kilocycle pulses obtained from a shock-excited LC oscillator 432, which is triggered by the output pulses from 1.46 microsecond delay circuit 430. The output of this oscillator is differentiated and clipped in differentiator 434 to obtain 224-kilocycle pulses which are applied in parallel to the six gate generators 362. The 224-kilocycle pulses are shown in graph 2420 and the trains of gate pulses generated by the distributor for application to the six step multivibrators are shown in graphs 2422 to 2432. It will be noted that a blank interval equal in duration to one gate pulse, occurs at the beginning of each train of gate pulses. This interval of time corresponds to that provided for the synchronizing signal in the first channel and left blank in each of the ensuing channels.

The output of each of the gate generators is applied to a start tube 364 and a stop gate circuit 366 which are provided for each of the step multivibrators. In the operation of the coder, the start tube for the step 1 multivibrator differentiates the leading edge of the first gate pulse 2434 of graph 2422 in Fig. 15 to obtain a sharp pulse which is then applied to the step 1 multivibrator to trigger it to the "on" condition. As a result, at the time of the leading edge of gate pulse 2434 the current initially drawn by the step 1 multivibrator is suddenly turned off. Consequently, the corresponding voltage drop through the summation network is removed and the voltage applied to step cathode follower 342 is suddenly increased by one-half. This voltage step, the amplitude of which corresponds to one-half the maximum amplitude range of the coder, is added to the sample stored on capacitor 358 and the sum of these two quantities appears at the output of a cathode follower tube 368 which repeats the voltage across storage capacitor 338 and resistor 340. The output of this cathode follower is applied to a comparison circuit 370 comprising a single trip multivibrator to one of the grids of which is appled a reference voltage equal to the maximum voltage to be accommodated by the system and to the other grid of which is applied the output of storage cathode follower 368.

If the output of storage cathode follower 368 exceeds the reference voltage, the comparison circuit 370 is switched from one of its conditions of stability to the other and its output voltage is suddently increased, being switched from a low value to some higher value. The output of comparison circuit 370 is applied to a second single trip multivibrator 372. This single trip multivbrator is provded with a reference voltage such that it will trip at the mid-amplitude of the output voltage step produced by the first single trip multivibrator. The output of the second single trip multivibrator is applied to a differentiator 374 to obtain a pulse occurring at the time at which the second single trip multivibrator is actuated. This pulse is passed through a 1-microsecond delay network 376 and is applied in parallel to all of the stop circuits 366. Each of these stop circuits comprises a gate tube and these tubes are successively enabled by the output pulses from gate pulse generators 362 at the same time that start tubes 364 are actuated. As a result only the stop circuit associated with the step 1 multivibrator will pass the delayed pulse from single trip multivibrator 372 and differentiator 374. This pulse returns the step 1 multivibrator to the "off" condition, removing the one-half amplitude step from the summation voltage applied to cathode follower 368 and consequently returning the comparison circuit 370 and single trip multivibrator 372 to their initial condition. Thus, delay network 376 determines the duration of the pulse appearing at the output of single trip multivibrator 372. This pulse, which is the code element pulse for the first denominational order of the code group is applied to pulse mixer 378 for combination with the synchronizing pulses from delayed and undelayed pulse mixers 414 and 416. It will be recognized that these synchronizing pulses occur in the first 4.46-microsecond interval of the channel frame, the trailing edge of the delayed synchronizing pulse occurring 2.46 microseconds before the production of the first code element pulse.

If the summation of the sample voltage applied to capacitor 338 and the one-half amplitude step voltage applied to step cathode follower 342 as described above is less than the reference voltage, comparison circuit 370 will not operate and as a result no code element pulse will be produced and applied to the stop circuit 366 for the step 1 multivibrator. As a consequence this multivibrator remains in the "on" condition and the half-amplitude step continues to be applied to step cathode follower 342.

At the time of the gate pulse from the second generator 362 of the code element gate distributor, start tube 364 for the step 2 multivibrator triggers this multivibrator to the "on" condition, cutting off the current drawn through the summation network by this circuit. As a result a step corresponding to one-quarter the total amplitude acceptable by the system is applied to step cathode follower 342. The summation of this quarter amplitude step, the half amplitude step is not removed at the conclusion of the first code element interval and the sample voltage stored on capacitor 338 is applied to the comparison circuit and produces a code element pulse in the second denominational order of the code group if the reference voltage is exceeded.

The remaining four step generators are triggered in the same fashion in the remaining four code element intervals of the first channel time and a complete code group representation of the sample amplitude is produced. The code element pulses of this code group after combination with the synchronizing pulses are applied to transmitter 304. The coder is then reset as described above and is in condition to code the sample for the second message channel, after a 4.46-microsecond interval corresponding to the blank at the beginning of the second channel frame.

*Schematic circuit diagram*

Certain of the component circuits forming elements of the block diagram described above will now be considered in more detail. A circuit schematic showing the detailed arrangements of a transmitting station is shown in Figs. 5 through 13 when arranged as shown in Fig. 2. Referring to this schematic, the 8-kilocycle master oscillator which regulates the operation of the entire communication system is indicated at 1200 in Fig. 10. This oscillator must have a high degree of frequency stability and may conveniently be of the type disclosed in Fig. 2 of Patent 2,385,260 to L. R. Cox, September 18, 1945. In accordance with this patent a flexure type mode crystal 1202 is employed to control an oscillator circuit comprising vacuum tube 1204 and associated circuit components. For this purpose crystal 1202 which is of the duplex plate type is connected in circuit in the following manner. One section of the crystal is connected in series with a tuning capacitor 1206 between control grid of vacuum tube 1204 and ground. The output of vacuum tube 1204 appearing across resistors 1207 and 1208 connected in series between the anode of tube 1204 and the positive terminal of battery 1210 is applied through a capacitor 1212 to a divider comprising resistors 1214 and 1216. An output taken from the junction of resistors 1214 and 1216 is fed back to the other section of crystal 1202. This particular type of crystal is sensitive to changes in the voltage applied to it and accordingly this voltage is held constant within a high degree of accuracy by compensating means shown herein as a varistor 1218 connected in series with a capacitor 1220 across the output of vacuum tube 1204. The varistor tends to hold the output voltage of the tube constant, while the combination of the varistor and capacitor 1220 acts to produce a voltage phase shift in response to changes of the gain of the amplifier which will compensate for the voltage phase shift caused in the crystal as a result of changes in the voltage applied thereto.

The output of crystal oscillator 1200 is applied to a tuned amplifier comprising a pentode 1222 which has a tuned circuit including inductor 1224 and resistor 1226 connected in series in the plate circuit. This amplifier provides a sinusoidal output at a frequency of eight kilocycles.

This sinusoidal output is converted into an 8-kilocycle square wave by clippers 1228 and 1230, which comprise pentode tubes operated as overdriven amplifiers having limiting resistors 1232 and 1234, respectively, in the grid circuits thereof. The first of these clippers cuts off the tops of the positive half-cycles of the sinusoidal input wave, while the second, operating on the inverted clipped wave from the first, cuts off the tops of the negative half-cycles to produce an essentially square wave output.

A circuit comprising a series capacitor 1236 and a shunt resistor 1238 in the output of clipper 1230 differentiates the square wave output therefrom and the output of the differentiating circuit, comprising alternate positive and negative pulses, is applied to a third clipper 1240 which operates as an overdriven amplifier. Only the negative pulses of the differentiated wave have any effect on the plate current of this clipper and these are inverted, appearing as a series of positive pulses in the plate circuit. These pulses are further shaped in cathode follower 1242 the output of which comprises a series of 1-microsecond pulses. It will be noted that since output connections are taken from both the plate and cathode of this tube both positive and negative 1-microsecond 8-kilocycle pulse series are available for use in the various portions of the equipment.

The positive 1-microsecond pulses obtained from the cathode of clipper 1242 are applied to a delay network 1400 which introduces a delay of two microseconds. The delayed pulses are applied to an isolation amplifier 1402 which may comprise a pentode tube. Positive pulses taken from the cathode of this tube are applied to pentode 1404 appearing as negative pulses across load resistor 1408. Undelayed positive pulses from the cathode of clipper 1242 are also applied to the control grid of pentode tube 1406 employing load resistor 1408, in common with the pentode 1404. Thus, the undelayed 1-microsecond pulse from vacuum tube 1242 appears as a negative pulse across load resistor 1408, while a second negative 1-microsecond pulse from delay network 1400 appears across the same resistor two microseconds later. These two pulses, separated by two microseconds, comprise the synchronizing signal employed to control the operation of the slave oscillator at the receiving station. For this purpose the output across load resistor 1408, which pentodes 1404 and 1406 share with a third pentode 900 in the output of the signaling circuit, is applied to an amplifier comprising pentode 902 and power amplifier tube 904. The negative pulses appearing across resistor 1408 are inverted to produce positive pulses in amplifier 902 and correspondingly appear as positive pulses in the cathode output of amplifier 904. The output from vacuum tube 904 is taken from the cathode through capacitor 906 for application to transmitting equipment shown generally at 908.

*Synchronization of transmitter circuits*

The control pulses required to coordinate the coöperation of the sampling, coding and distributing circuits at the transmitter are provided by a series of pulse generating and shaping circuits driven by master oscillator 1200.

The 8-kilocycle, 1-microsecond pulses appearing at the output of amplifier 1402 are employed to control the several circuits required to generate pulses of the required polarities and repetition rates for use in the various circuits of the transmitter. Accordingly, the negative pulses from the anode circuit amplifier 1402 are employed to trigger a multivibrator tuned to 32 kilocycles. This multivibrator, which comprises the two sections of a dual triode tube 1300 connected in a conventional circuit, provides two output waves of essentially square wave form. The output from the plate of the right-hand section of multivibrator tube 1300 is differentiated through the action of series capacitor 1302 and shunt resistor 1304 to produce a series of pulses of alternate polarity. The negative pulses of this series correspond to the leading edges of the square wave pulses produced by the multivibrator and are in phase with the 8-kilocycle pulses by which the multivibrator is triggered. The positive pulses of this series are eliminated by a clipper comprising pentode 1312 the output of which accordingly comprises a series of positive pulses occurring at a repetition rate of 32,000 per second. These pulses, which for convenience will be referred to as 32-kilocycle 0° pulses, are further shaped in amplifier 1314 and are employed in subsequent portions of the synchronizing circuits.

The output from the other plate of multivibrator 1300 is differentiated by series capacitor 1306 and shunt resistor 1308 and the differentiated wave is clipped in pentode 1310 to produce a series of positive output pulses occurring at the rate of 32,000 per second and 180° out of phase with the 32-kilocycle 0° pulses produced at the output of clipper 1312. The pulses produced by clipper 1310 will be referred to hereinafter as 32-kilocycle 180° pulses. The 32-kilocycle 180° pulses are applied to the input time division gate generator. Negative 32-kilocycle 0° pulses from the plate of amplifier 1314 are also inverted and amplified in triode 1316 to obtain positive 32-kilocycle 0° pulses which are applied to discharge the storage capacitor of the coding equipment.

The positive pulses from the cathode of amplifier 1314 are applied to a 2-microsecond delay network 1500, the output of which is reshaped by amplifier 1502. The negative pulses from the plate of amplifier 1502 are applied to the sampling tubes in the input circuits of the four channels and serve to gate through the input signal of the sampling tube which is at the same time enabled by an output pulse from the input time division multiplex distributor. The output of amplifier 1502 is also applied to inverter amplifier 1504. Amplifier 1504 is connected to operate as a cathode follower with cathode resistor 1000 and the negative pulses therefrom are applied in parallel to the six flip-flop circuits of the coder to restore these circuits to the "off" condition prior to the initiation of the coding operation. Positive pulses appearing in the plate circuit of amplifier 1504 are applied to a delay network 1506 which introduces a delay of 1.46 microseconds and the delayed pulses are applied to a cathode follower comprising triode 1508. The positive 32-kilocycle 0° pulses appearing across the load resistor 1244 of this cathode follower are employed to initiate the operation of the code element gate distributor. These pulses are also employed to shock-excite an LC oscillator comprising triode 1510, the cathode circuit of which includes inductor 1512 and capacitors 1514 and 1516, the combination of these elements being tuned to the frequency of 224 kilocycles. The output of this oscillator is taken through a cathode follower 1518 to provide a high impedance load and thus to avoid loading down the tuned circuit. The 224-kilocycle sinusoidal wave appearing across load resistor 1520 of cathode follower 1518 is clipped in clipper stages 1522 and 1524 to obtain a 224-kilocycle square wave which in turn is differentiated by the combination of capacitor 1526 and resistor 1528 and clipped in triode clipper 1530 to obtain a series of positive pulses occurring at a repetition rate of 224,000 per second. These pulses are applied to the code element gate distributor to terminate the operation of the gate output pulses from each of the gate generators.

*Gate distributor circuits*

As pointed out in the description of the block diagram the present communication system employs several gate distributor circuits. These circuits are arranged to produce series of gate pulses occurring in timed relationship and made available in separate circuits. Thus in the transmitter a 4-stage gate distributor is employed to control the input time division multiplex circuit. Six-stage gate distributor circuits are also employed at the transmitter to control the operation of the coding equipment.

Figure 10:
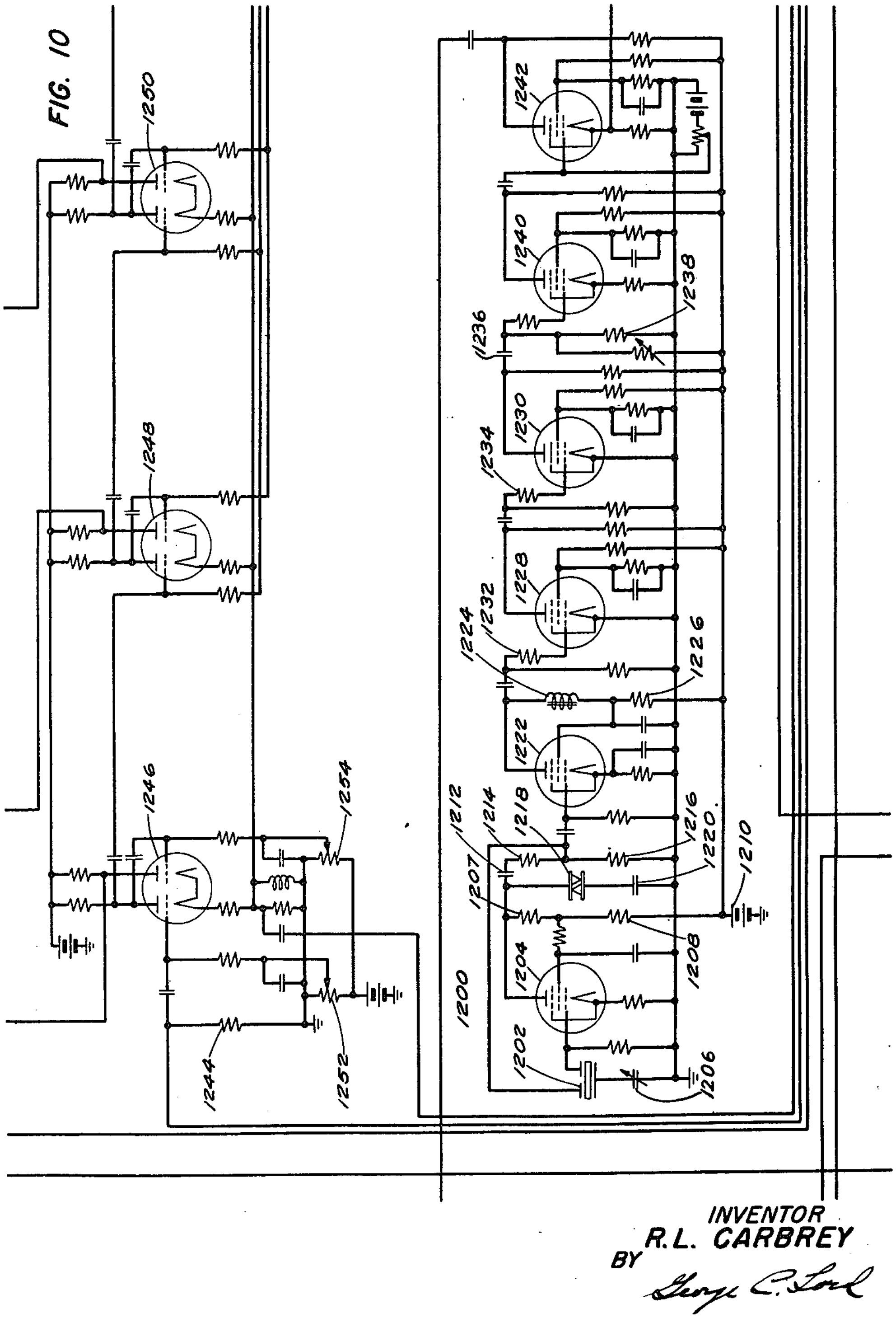
Figure 11:
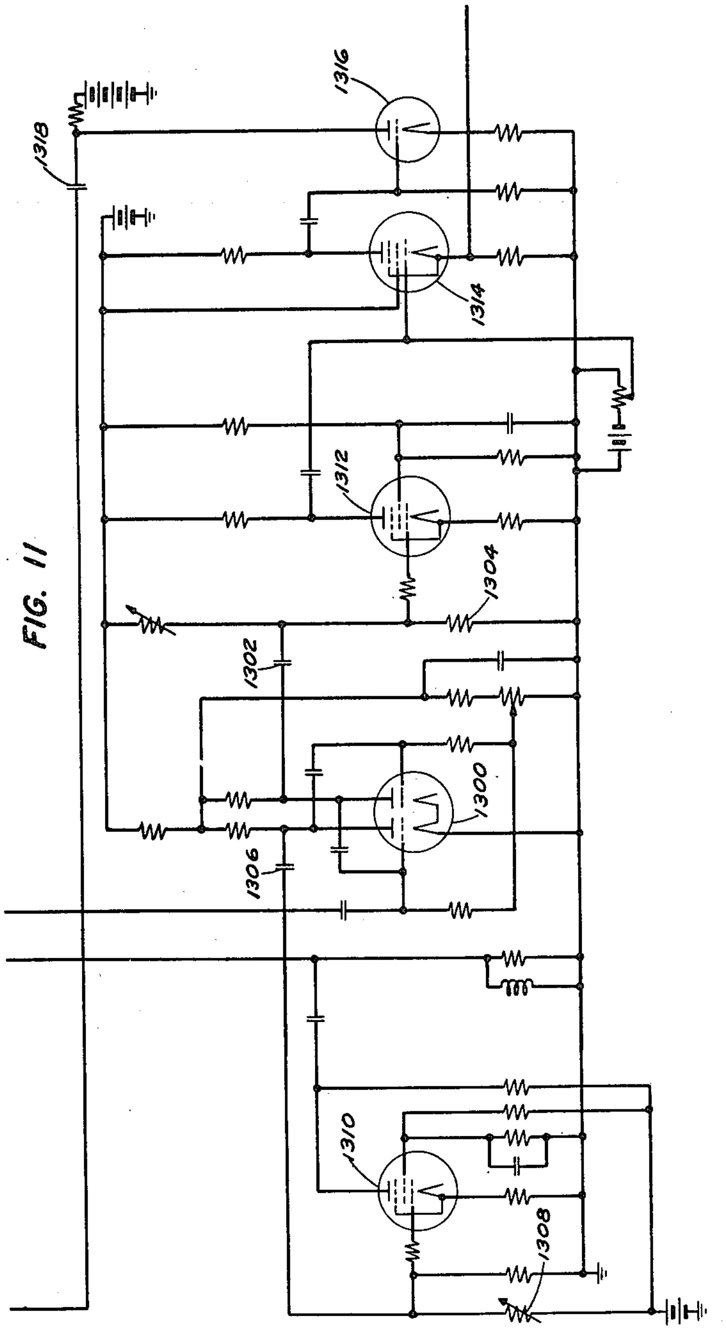
Figure 12:
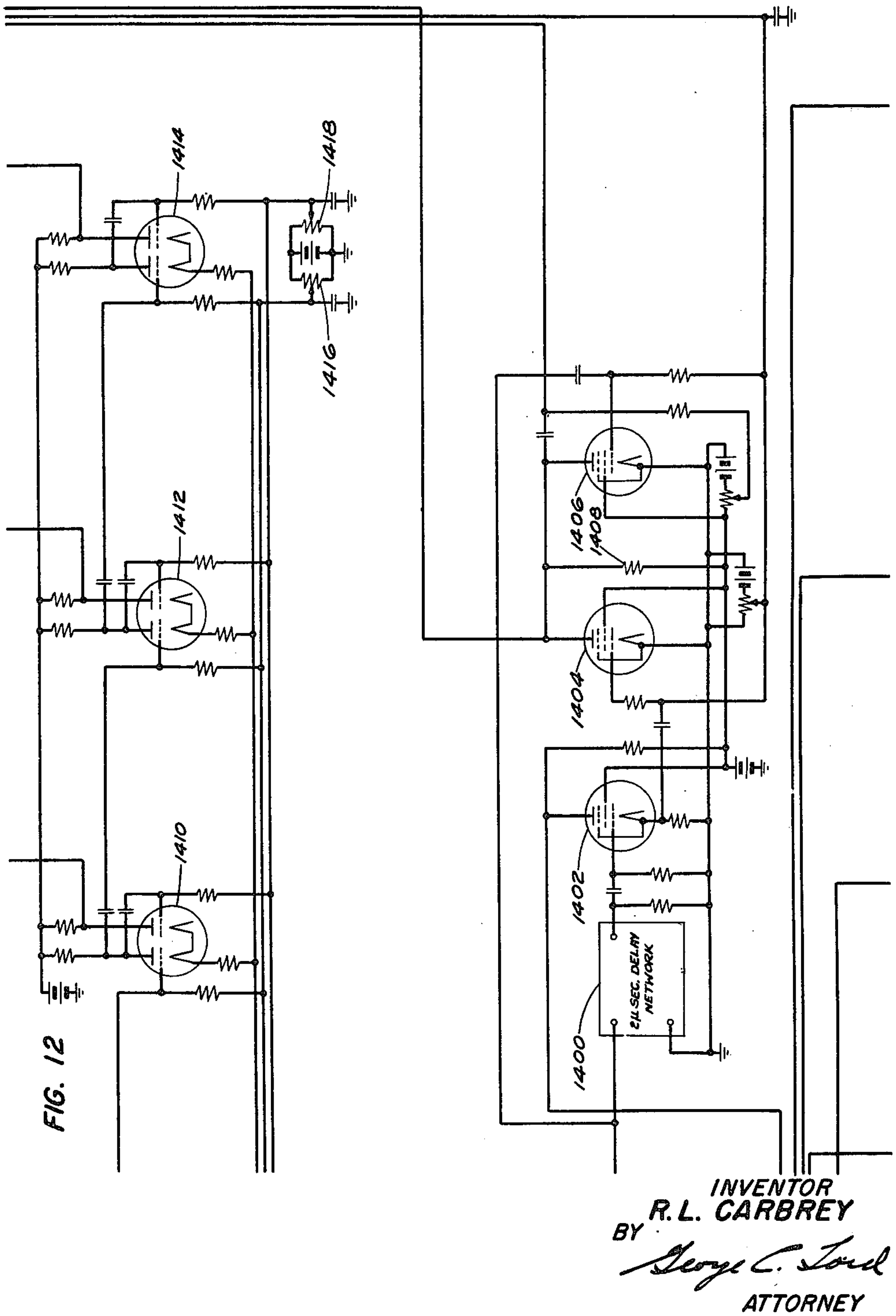
Figure 13:
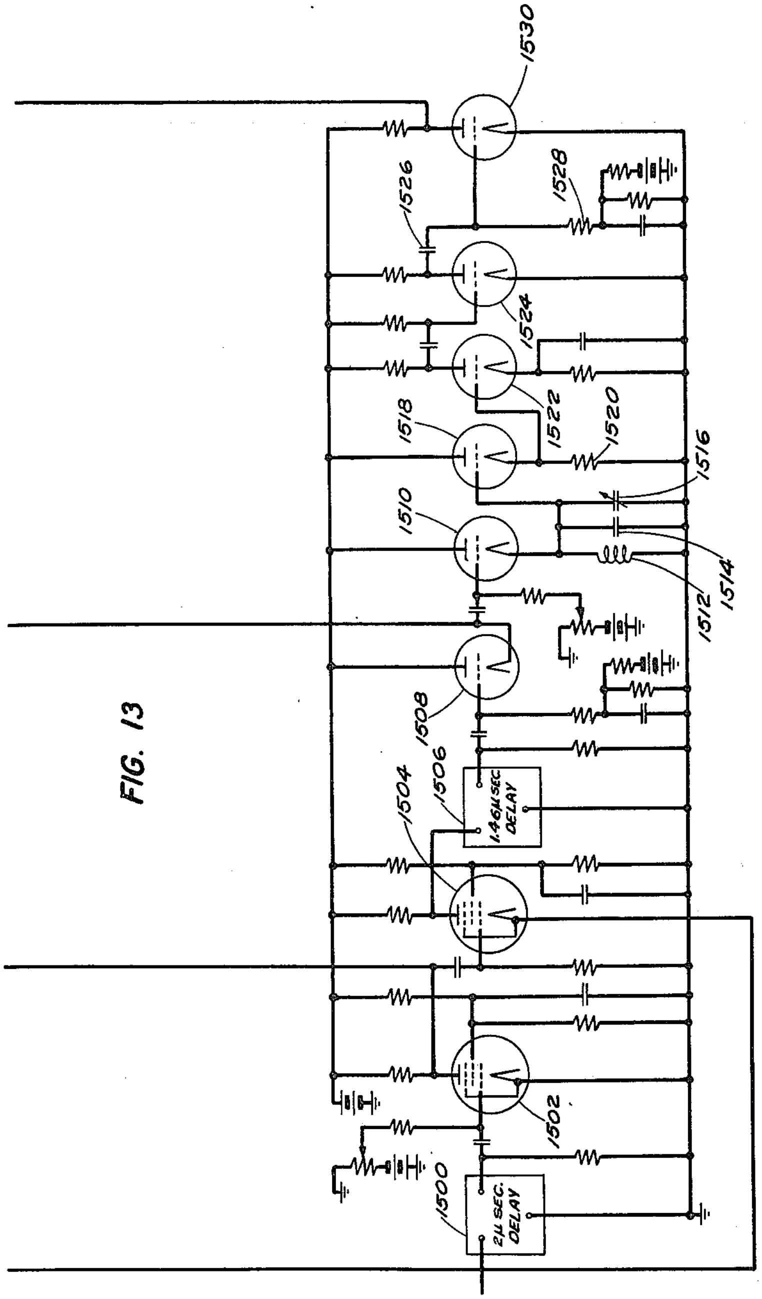

Conveniently all of these gate distributor circuits may be of the same type and may, for example, be of the general type disclosed in copending application, Serial No. 646,455, filed February 8, 1946, in the name of L. A. Meacham, now Patent No. 2,486,491, November 1, 1949. Since all of the gate distributors may be of the same type it will be sufficient to describe only one of them in detail. By way of example, a 6-stage gate distributor shown in the upper portions of Figs. 10 and 12 is employed to control the operation of the coder at the transmitting station. This distributor comprises six single trip multivibrators 1246, 1248, 1250, 1410, 1412 and 1414 each including the two sections of a dual triode tube. In each of these single trip multivibrators the anode of the left-hand section of the tube is connected through a capacitor to the grid of the right-hand section while the two cathodes are connected together and through a common load resistor to ground. These six multivibrators are connected in a chain circuit with the plate of the left-hand section of each of the dual triodes capacitor-coupled to the grid of the left-hand section of the succeeding dual triode in the chain. Positive bias voltages obtained from potentiometers 1252 and 1254 for the first stage and from potentiometers 1416 and 1418 for the remaining stages are so adjusted that the grid potentials of the right-hand sections of the tubes are higher than those for the left-hand sections. Accordingly, current normally tends to flow in the hight-hand section of each tube. This current flow increases the voltage drop across the common cathode resistor for each stage and thus assists in preventing current flow through the left-hand section of the tube.

Operation of the distributor is controlled by two sets of pulses shown in graphs 2407 and 2420 of Fig. 15. The first of these sets of pulses, having a repetition rate of 32 kilocycles, is applied only to the first stage of the chain and controls the initiation of a cycle of operation. The second set of pulses, having a repetition rate of 224 kilocycles, is applied in parallel to the cathodes of all of the stages of the chain circuit and is employed to control precisely the duration of each of the gate pulses. As may be seen by comparison of graphs 2407 and 2420 which are drawn on the same time base the gate cut-off pulses of graph 2420 divide the interval between the control pulses of graph 2407 into seven equal periods. It will be noted, however, that only six gate generators are provided. This particular distributor is employed to control the coding equipment and only six code pulses are required, the seventh interval being left blank for the synchronizing signals.

It will be convenient to consider the operation of the circuit first as affected only by the control pulses, it being assumed for the moment that no gate cut-off pulses are applied to the cathodes of the code generator stages. Assuming therefore that all of the single trip multivibrators are in their condition of permanent stability (in which current flows through the right-hand section of each of the dual triode tubes), operation of the distributor is initiated by a positive control pulse applied to the grid of the left-hand section of tube 1246. Upon application of this positive pulse, the grid potential of the left-hand section of tube 1246 is made sufficiently positive with respect to the cathode thereof to permit the initiation of current flow through that section of the tube. Immediately the anode potential of the left-hand section of the tube is reduced causing the coupling capacitor to discharge. This applies a negative potential to the grid of the right-hand section of the tube such that current flowing through this section is cut off. In the absence of the gate cut-off pulses and after an interval determined by the relative values of the coupling capacitor connected between the anode of the left-hand section and the grid of the right-hand section of the tube and the resistor connected in the grid circuit of the right-hand section, the potential applied to the grid of the right-hand section returns to such a value that plate current will again begin to flow through this section of the tube. The voltage drop across the common cathode resistor is increased in response to this current flow to such an extent that the left-hand section of the tube is cut off, the control pulse having terminated during the period in which the left-hand section of the tube was conducting.

The anode of the left-hand section of single trip multivibrator 1246 is coupled to the left-hand section of single trip multivibrator 1248 through an RC circuit which tends to differentiate the square wave output appearing at the anode of single trip multivibrator 1246. Accordingly, the derivative of the output of the left-hand section of single trip multivibrator 1246 will control the operation of the second single trip multivibrator of the chain. Thus when current flow is switched from the right-hand section to the left-hand section of single trip multivibrator 1246, a negative pulse is applied to the grid of the left-hand section of single trip multivibrator 1248. Since this section is already cut off, this negative pulse will have no effect upon the operation of the second single trip multivibrator. Upon completion of the cycle of the first single trip multivibrator, however, current flow is switched back from the left-hand section to the right-hand section with the result that a positive pulse is applied to the control grid of the left-hand section of single trip multivibrator 1248. This positive pulse triggers the second single trip multivibrator which then goes through a cycle of operation identical with that of the first single trip multivibrator.

The RC circuits of each of the six single trip multivibrators may be adjusted to control the duration of the six gate pulses produced by the distributor. More precise timing of the gate pulses is accomplished, however, through the use of the gate cut-off pulses referred to above. These pulses are applied to the cathodes of all six single trip multivibrators in parallel and their effect modifies the operation of the gate distributor circuit described above. When the gate cut-off pulses are employed, the RC circuits of the single trip multivibrators are adjusted to produce a natural period which is a very slight amount longer than the desired durations of the code pulses. The positive gate cut-off pulses are then relied upon to time the operation of each of the six single trip multivibrators. These positive pulses are of an amplitude such that they are effective to cut off current flow in the left-hand section of any single trip multivibrator which may be in the condition of tempory stability but the pulses are not of sufficient amplitude to cut off current flow through the right-hand section of any single trip multivibrator when it is in the condition of permanent stability. This may be accomplished because of the fact that the bias voltages applied to the left- and right-hand sections of the single trip multivibrator stages are such that current flow is normally through the right-hand section of each stage.

Considering the operation of the chain circuit in the presence of both control and gate cut-off pulses, it will be seen that initially a control pulse is applied to the grid of the left-hand section of single trip multivibrator 1246 at the same time that a gate cut-off pulse is applied to the cathodes of all of the single trip multivibrators of the chain. The positive control pulse applied to the grid of the left-hand section of single trip multivibrator 1246 is of sufficient amplitude to override the positive cut-off pulse applied to the cathode of this stage and current flow is accordingly switched from the right-hand to the left-hand section of this stage as described previously. In each of the other five stages, the positive cut-off pulse is not of sufficient amplitude to terminate current flow through the normally conducting right-hand section of the single trip multivibrator. Returning now to the first stage, the second gate cut-off pulse is applied to the cathodes of the single trip multivibrators just before the grid potential of the right-hand section of the first stage would ordinarily return to a value such that current flow through that section might be reestablished. The gate cut-off pulse, however, suddenly raises the cathode potential of the left-hand section of the tube thereby reducing the current in this section. The resulting increase in the positive voltage in its plate circuit is transferred to the grid of the right-hand section by the capacitor. This increase in the grid-cathode potential is greater than the decrease caused by the gate cut-off pulse because of the amplification in the left-hand section. As a result, the grid potential is suddenly raised to a value above that necessary to cause the right-hand section to start conduction. This initiates the rapid transfer of current from the left-hand to the right-hand section, and the square wave output of the single trip multivibrator is precisely treminated.

The termination of the square wave output of the left-hand section of the multivibrator 1246 results in the application of a positive pulse from the differentiating coupling circuit to the left-hand section of the second stage of the chain. This positive pulse is of sufficient amplitude to override the gate cut-off pulse applied to the cathode of that stage and a cycle of operation is initiated in the second stage of the chain.

The gate distributors employed to control the time division multiplex circuits of the transmitter differ from those described in that each has four stages rather than six and in the frequencies of the control and gate cut-off pulses which are employed. Thus at the transmitter the time division code distributor comprises four single trip multivibrators 700, 702, 800 and 802. In the case of this gate distributor it is desired to produce a series of gate pulses occurring at a repetition rate of eight kilocycles and each having a duration of 31.25 microseconds. Accordingly, the control pulses employed to initiate the operation of these distributors occur at a repetition rate of eight kilocycles while the gate cut-off pulses occur at a repetition rate of 32 kilocycles. These pulses are obtained from the synchronizing circuits of the transmitting station as has been described above.

*Input message channels*

The four input channels for the system are identical and messages applied thereto are sampled in turn for application to the coding equipment. Thus signals from input transducers such as microphones 704, 706, 804 and 806 are applied through terminal equipment to the input of voice-operated gain devices or vogads 708, 710, 808 and 810 respectively. In each channel, the vogad output signal, the volume range of which is reduced in respect to the volume range of the input signal, is applied through a transformer to a buffer amplifier. The outputs of the buffer amplifiers of the four channels are applied to the suppressor grids of pentodes 712, 714, 812 and 814 respectively. These pentodes serve both as the time division distributor and as the sampling devices for the input to the coding equipment.

The gate pulses from the input gate distributor are applied to the control grids of sampler tubes 712, 714, 812 and 814 and serve to enable each of these tubes in turn. Any flow of current through these tubes is prevented except during a desired sampling interval by a bias voltage applied to the control grids which is sufficiently large to prevent current flow unless both the gate distributor pulse and a sampling pulse are applied to the tubes simultaneously. When it is desired to obtain a sample of an input message signal a negative sampling pulse is applied in parallel to the cathodes of the four sampler tubes. Only that tube which is at that moment enabled by the gate pulse from the input gate distributor will permit the flow of plate current. Assuming that a sampling pulse is applied to the cathodes of the sampler tubes during the gate pulse from single trip multivibrator 700 of the input gate distributor, plate current will flow only through sampler tube 712. The distribution of current flow between the plate and screen circuits of this tube will be determined by the potential on the suppressor grid thereof, this potential being a function of the amplitude of the input message signal at that particular moment. Thus the drop across anode resistor 716 will represent the instantaneous amplitude of the message signal in the first channel during the sampling interval for that channel.

The sampler is also arranged to add a direct current component to the input signal so that all amplitude samples will be of positive polarity. For this purpose, the grid bias of sampler tube 712 is so adjusted that in the presence of both the enabling and gating pulses, an output signal equal in amplitude to at least one-half the total possible range of amplitude will be produced even when there is no input message signal.

The remaining samplers are identical to that comprising tube 712 and each is enabled in turn so that potential drops corresponding to the message signals in the other channels will appear in turn across resistor 716 which serves as the common anode resistor for the four sampling tubes. Accordingly, the combined output from the four samplers comprises a series of negative pulses of amplitudes respectively determined by the instantaneous amplitudes of the message signals present in the four message channels at the time of sampling. These negative sample pulses are inverted in amplifier 718 and are applied successively to the coding equipment.

*Coding equipment*

The general theory of operation of the coding equipment has been described above in connection with the block diagram of the system. The detailed circuit arrangement and the operation thereof for the purpose of coding a single sample pulse will now be considered.

The positive sample amplitude pulse representative of the amplitude of the message signal at a particular instant in one of the message channels is applied to a storage tube 912 which comprises a triode-type tube, the cathode circuit of which includes a capacitor 914 and a resistor 920. Storage tube 912 operates as a cathode follower and capacitor 914 is charged to a value equal to the peak amplitude of the sample during the rise of the leading edge of the sample amplitude pulse. Normally, no discharge path is provided for capacitor 914 so that this charge is held on the storage capacitor for the duration of the coding operation.

It will be recalled that the coding operation takes place essentially as follows: A voltage equal in amplitude to one-half the peak-to-peak amplitude of the maximum acceptable message signal is added to the voltage stored on capacitor 914 and the sum of these two voltages is compared with a reference voltage equal to the maximum acceptable peak-to-peak message signal amplitude to determine whether or not a code element pulse shall be generated. If a pulse is generated it indicates that the sum of the sample amplitude and the step voltage added thereto exceeds the reference voltage. Accordingly, the first step voltage is removed and a second step voltage of amplitude equal to one-quarter the range is added to the stored sample. If, on the other hand, the sum of the storage voltage and the first step voltage is less than reference voltage, the step voltage is allowed to remain and the one-quarter amplitude step is added to the sum of these two voltages. This process is repeated, the number of steps employed being equal to the number of code element pulses to be used in the code groups for transmission over the system.

The voltage steps which are added to the sample voltage stored on capacitor 914 are produced by a series of double stability circuits of the type commonly known as "flip-flop" circuits arranged to control the flow of current through a resistance network. Assuming that a 6-element code is to be employed, the voltage steps are generated by flip-flop circuits 1002, 1004, 1006, 1100, 1102 and 1104 which control the flow of current through a network of resistors connected in series and comprising resistors 1008, 1010, 1012, 1106, 1108 and 1110. The first of the flip-flop circuits 1002 is typical of all six and it will be considered in detail.

Flip-flop circuit 1002 comprises a pair of pentode-type tubes 1014 and 1016 together with associated circuit components. The cathodes of these two tubes are connected to ground. The cathode, grid and screen grid of pentode tube 1016 are employed as the elements of a triode tube, the output of which is electron-coupled to the anode of the pentode tube 1016. A bias potential derived from divider resistors 1018 and 1020 connected in series between the negative terminal of battery 1019 and ground is such that current normally flows in this tube. In pentode 1014 the cathode and suppressor grid are connected in such a way that they and the anode of the tube form a triode circuit. The control grid of tube 1014 is employed only for triggering purposes and does not form a part of the flip-flop circuit. The inter-tube connections are those employed in a conventional flip-flop circuit, that is, the anode of tube 1014 is connected through resistor 1022 and capacitor 1024 in parallel to the control grid of pentode 1016, while the screen grid of tube 1016 is connected through the paralleled resistor 1026 and capacitor 1028 to the suppressor grid of tube 1014 which for the purposes of the flip-flop circuit, acts as the control grid. The bias voltages applied to the control grid of tube 1016 and the suppressor grid of tube 1014 and the associated circuit components are so adjusted that current can flow in only one of the two tubes at a time. Thus, if current flow is initiated through tube 1016 the reduction in the screen potential thereof, coupled to the suppressor grid of tube 1014 through resistor 1026, lowers the control voltage applied to this latter tube and thus prevents the flow of current therethrough. Conversely the relatively high anode voltage of tube 1014 which results from the fact that no current is flowing therethrough is applied through resistor 1022 to the control grid of tube 1016 and tends to increase the amount of current flowing therethrough. These two effects continue once current flow has been initiated in one of the tubes until the tube in which current flow has been initiated is passing saturation current, while the other tube is entirely cut off.

At the initiation of a coding cycle a negative pulse is applied to the suppressor grid of the left-hand tube of each of the six flip-flop circuits. This pulse, which is of sufficient amplitude to cut off the flow of current of these tubes, accordingly switches all of the flip-flop circuits to the condition of stability in which current flows through the right-hand tube of each circuit. Thus, initially current flows through pentode 1016 of the first flip-flop stage. This tube and the right-hand tubes of each of the other flip-flop stages will be referred to as the "off" tubes while the left-hand tubes of each of the flip-flop stages will be referred to as the "on" tubes. Anode potential for each of the "off" tubes is obtained through the resistance network comprising resistors 1008, 1010, 1012, 1106, 1108 and 1110 from battery 1112. Consequently, when each of the flip-flop circuits is in the "off" condition it draws current through this resistance network. While it is in the "on" condition, on the other hand, no current is drawn by it through this resistance network. Assuming that the "off" tubes draw equal constant currents, the several resistors of the resistance network are proportioned in the following manner. Resistor 1110 is arranged to have an ohmic value of R, this value being sufficient to produce in response to the current flow to the "off" tube of any multivibrator a voltage equal to one unit of the total peak-to-peak amplitude to be accepted by the system. Resistor 1108 also has an ohmic value of R while resistors 1106, 1012, 1010 and 1008, respectively, have ohmic values of 2R, 4R, 8R and 16R. Thus it will be recognized that when flip-flop 1002 is in the "off" condition it draws anode current through a total resistance of 32R. Similarly, flip-flop 1004 has a load resistor of 16R, flip-flop 1006 a load resistor of 8R, flip-flop 1100 a load resistor of 4R, flip-flop 1102 a load resistor of 2R and flip-flop 1104 a load resistor of R.

The total voltage drop across the resistance network is applied to triode 922 which is connected as a cathode follower tube employing resistor 920 as the cathode resistor. It will be recalled that this resistor formed a portion of the cathode circuit of storage tube 912 being connected in series with storage capacitor 914. The voltage across the series combination of storage capacitor 914 and resistor 920, being the cathode voltage of storage tube 912, is applied to a cathode follower stage comprising the two sections of a dual triode tube 924 connected in parallel. The output of this cathode follower is connected to the control grid of the left-hand section of dual triode tube 926 which is connected with the right-hand section of dual triode 926 in a single trip multivibrator circuit similar to those employed in the various gate distributors described above except that the plate load resistor of the left-hand section is made just large enough to cause triggering. Thus as soon as the grid potential of the left-hand section drops below that of the right-hand section the circuit will trigger back to normal stability. The RC time constant does not determine the pulse duration. A reference voltage derived from battery 928 is applied to the grid of the right-hand section of tube 926. This reference voltage is held constant through the use of a diode limiter tube 930 which is connected in series with resistor 932 and the potentiometer 934 across battery 928.

Capacitor 935 connected from the cathode of diode 930 to ground is of so large a value that the diode currents make only minute changes in the potential to which the capacitor is charged and these changes average out over the operating cycle. Therefore, the potential of the cathode of diode 930 is held substantially constant at the value determined by the setting of potentiometer 934. In the absence of signal from cathode follower 924, the voltage on the grid of the right-hand section of tube 926 is determined by the divider consisting of resistor 932 and the impedance of diode 930. Diode 930 normally passes very little current, and, therefore, constitutes a high impedance. If the potential of the anode of the diode is driven above that of the cathode, the diode becomes a low impedance and passes current. The resultant voltage drop at the anode practically cancels the voltage rise which produced it with the result that the grid voltage of the right-hand section of tube 926 rises very little. When the anode potential is driven below that of the cathode, the diode becomes high impedance and the full signal is transmitted from the anode of the left-hand section to the grid of the right-hand section of tube 926. Initially, potentiometer 934 is so adjusted that when all of the flip-flop circuits controlling the current in the resistance network described above are in the "off" condition and a signal equal to the maximum peak-to-peak amplitude to be accepted by the system is applied to storage tube 912, the resultant summation potential applied to the grid of the left-hand section of single trip multivibrator 926 will be just insufficient to trigger the single trip multivibrator, current flow in the single trip multivibrator normally being in the right-hand section thereof.

In order to perform the coding operation, each of the flip-flop circuits is switched in turn from the "off" to the "on" condition. When the first of the flip-flop circuits 1002 is so switched the voltage drop across the resistance network is reduced by one-half. Thus the output voltage of cathode follower 922 is suddenly increased by an amount equal to one-half the total amplitude range acceptable by the system. Similarly, when flip-flop circuit 1004 is switched to the "on" condition the voltage across cathode resistor 920 of cathode follower 922 is increased by one-quarter the total range. Correspondingly, when flip-flop circuits 1006, 1100, 1102, 1104 are switched to the "on" condition voltage increments equal to one-quarter, one-eighth, one-sixteenth and one-thirty-second, respectively of the total amplitude range appear across cathode resistor 920.

The switching operation by means of which the flip-flop circuits are successively changed from the "off" to the "on" condition is controlled by the code element gate distributor which has been described above. This distributor provides a series of positive gate pulses each of duration equal to one code element which are employed to control the flip-flop circuits in the following manner. At the beginning of the coding operation the first gate pulse of the gate distributor is employed to switch flip-flop 1002 to the "on" condition. For this purpose, the positive gate pulse from single trip multivibrator 1246 is differentiated by the combination of capacitor 1030 and resistor 1032 and applied to a clipper stage comprising the left-hand section of dual triode 1034. The negative pulse appearing in the plate circuit of this section is applied through capacitor 1036 to the control grid of tube 1016 of the first flip-flop circuit, this tube being the tube through which current flows after the flip-flop circuits have been reset prior to the initiation of the coding operation. This negative pulse is of sufficient amplitude to cut off the flow of current in tube 1016 and consequently to initiate the flow of current in tube 1014. As a result of this change in flip-flop circuit 1002 current is no longer drawn through resistor 1008 of the summation network and the total voltage drop across the network is reduced by one-half. As a result, a voltage rise equal to one-half the total amplitude range of the system appears across cathode resistor 920 of cathode follower 922 and is effectively added to the sample voltage stored on capacitor 914.

If the sum of the sample voltage and the one-half amplitude step voltage as applied through cathode follower 924 to the grid of the left-hand section of single trip multivibrator 926 exceeds the reference voltage applied to the grid of the right-hand section, the single trip multivibrator will be switched from its normal condition of stability in which current flows through the right-hand section of the tube to the condition of transient stability in which current flows through the left-hand section of the tube. As a result the plate potential of the right-hand section of tube 926 will be increased and a positive transient will be applied through coupling capacitor 936 to the control grid of the left-hand section of dual triode 938. If, on the other hand, the summation of the sample voltage and the step voltage applied to the control grid of the left-hand section of comparison single trip multivibrator 926 is less than the reference voltage applied to the control grid, the single trip multivibrator will remain in its normal condition of stability and the plate potential thereof will remain unchanged.

The two sections of dual triode 938 are connected in a single trip multivibrator circuit with the anode of the left-hand section connected through capacitor 940 to the control grid of the right-hand section. A bias voltage obtained from potentiometer 942 connected in series with resistor 946 across battery 948 is adjusted so that normally current flows through the right-hand section of tube 938 and so that a voltage of amplitude equal to at least half the total amplitude of the transient appearing in the output of single trip multivibrator 926 must be applied to the control grid of the left-hand section of single trip multivibrator 938 to trigger it to its transient condition of stability.

Assuming that single trip multivibrators 926 and 938 have been triggered indicating that the summation voltage exceeds the reference voltage, a positive transient from the anode of the right-hand section of single trip multivibrator 938 is applied to the differentiator comprising capacitor 950 and resistor 952. The output pulse from this differentiator is amplified in vacuum tube 954 which may be a beam power tube and applied to a delay network 956 which introduces a delay of 1 microsecond. The output of the delay network, which is a negative pulse, is applied to the cathodes of each of vacuum tubes 1036, 1114 and 1116 in parallel.

The gate pulse from single trip multivibrator 1246 of the code element gate distributor is supplied to the control grid of the left-hand section of dual triode 1036 and enables this tube throughout the 4.46-microsecond code element period at the beginning of which flip-flop circuit 1002 is switched to the "on" condition and the comparison described above is made. If, as assumed above, the summation voltage exceeds the reference voltage and a transient is applied to the cathode of vacuum tube 1036, a negative pulse will be gated through this tube and applied to the control grid of pentode 1014 of flip-flop circuit 1002. This negative pulse is effective to switch flip-flop circuit 1002 from the "on" condition to the "off" condition thereby reestablishing the flow of current through pentode 1016 and the resistance network. As a result, the step voltage is removed from the summation voltage appearing across the cathode circuit of storage tube 912, the comparison single trip multivibrator is restored to its initial condition, single trip multivibrator 938 is switched to its initial condition and the negative voltage applied to the cathode of tube 1036 is removed. Thus it will be seen that when the summation voltage exceeds the reference voltage single trip multivibrator 938 is switched to the "on" condition for a period determined by the delay introduced by delay network 956, in this case 1 microsecond. Accordingly, a 1-microsecond pulse appears across anode resistor 958 of the right-hand section of single trip multivibrator 938. This pulse is applied through amplifier 900, the load resistor of which is common to the delayed and undelayed pulse amplifiers of the synchronizing circuit and thus to radio transmitter 908.

If the summation voltage fails to exceed the reference voltage single trip multivibrators 926 and 938 will not be triggered. No feedback pulse will appear at the output of delay network 956 and flip-flop circuit 1002 will be allowed to remain in the "on" condition. As a consequence of this state of affairs, the one-half amplitude step voltage continues to appear across cathode resistor 920 and no code element pulse is produced at the output of amplifier 900.

At the time of the second gate pulse, the output of single trip multivibrator 1248 of the gate distributor is differentiated by capacitor 1038 and resistor 1040, clipped in the right-hand section of vacuum tube 1034 and applied to the control grid of the right-hand tube of flip-flop circuit 1004. This pulse switches the flow of current from the right-hand tube to the left-hand tube of flip-flop circuit 1004 and consequently causes an increase in the voltage across cathode resistor 920 equal to one-quarter the total possible amplitude to be accepted by the system. The comparison process is repeated and the feedback pulse which is produced if the summation voltage now exceeds the reference voltage is fed back through the right-hand section of dual triode 1036 which was enabled by the output of single trip multivibrator 1248 at the time of the second gate pulse to return flip-flop circuit 1004 to its initial condition. Similarly, each of the remaining flip-flop circuits is in turn switched to the "on" condition, the pulses for this purpose being obtained from single trip multivibrators 1250, 1410, 1412 and 1414 in turn. Pulses from the outputs of single trip multivibrators 1250 and 1410 of the distributor are applied respectively through the left- and right-hand sections of dual triode 1042, to flip-flop circuits 1006 and 1100 of the coder and the gate pulses from single trip multivibrators 1412 and 1414 of the distributor are applied through the left- and right-hand sections respectively of dual triode 1118 to flip-flop circuits 1102 and 1104. The two sections of dual triode tube 1114 serve respectively as the stop gate tubes for flip-flop circuits 1006 and 1100. Thus the output of single trip multivibrator 1250 is employed to control the left-hand section of tube 1114 while the output of single trip multivibrator 1410 controls the operation of the right-hand section of tube 1114. Similarly dual triode tube 1116 serves as stop gate tube for flip-flop circuits 1102 and 1104, the left- and right-hand sections of tube 1116 being controlled by single trip multivibrators 1412 and 1414, respectively.

What is claimed is:

1. In a coder for expressing the amplitude of a wave form as a binary code group of $n$ pulses each of which may have either of two values, means for storing a sample of the instantaneous amplitude of said wave form, means for generating a series of $n$ voltage steps related in amplitude as decreasing powers of two, the amplitude of the first step being equal to one-half the total possible amplitude range of said coder, means for adding each of said steps in turn to the sample voltage, means for generating a reference voltage equal to said total possible amplitude range, means for comparing the sum of the step and sample voltages with the reference voltage after each addition, means for generating a pulse whenever the sum voltage exceeds the reference voltage, and means operative upon the generation of a pulse for removing the last added step from said sum.

2. A coder for expressing the amplitude of a wave form as a code group of $n$ pulses, means for storing a sample of the instantaneous amplitude of said wave form, a source of potential, an output circuit, a network of $n$ resistors having ohmic values related as powers of two connected in series in order of ascending ohmic value between said sources of potential and said output circuit, a normally on current device connected to the end of each of said resistors remote from said potential source, means for turning off each of said current devices beginning with that most remote from said potential source, means for adding the voltage in said output circuit to the sample voltage each time a current device is turned off, a source of reference voltage of amplitude equal to the total possible range acceptable by said coder and means operative whenever said output voltage plus said sample voltage exceeds said reference voltage for turning on the current device last turned off.

3. A coder for expressing the amplitude of a wave form as a code group of signals, means for storing a sample of instantaneous amplitude of said wave form, a source of potential, an output circuit and a network of resistors equal in number to the signals of said code groups and having ohmic values related as powers of two connected in series in the order of ascending ohmic value between said source of potential and said output circuit, a double stability circuit connected to the end of each of said resistors remote from said potential source and arranged in one condition stability to draw current through said resistors from said potential source, means for initially switching each of said double stability circuits to its current-drawing condition of stability, means for switching each of said double stability circuits in turn beginning with the one most remote from said potential source to its other condition of stability, means for adding the voltage in said output circuit to the sample voltage each time one of said double stability circuits is switched to its other condition of stability, a source of reference voltage of amplitude equal to the total possible range acceptable by said coder and means operative whenever the sum of said output and sample voltages exceeds said reference voltage for returning to its initial condition of stability the last double stability circuit to be switched to its other condition of stability.

4. A coder for expressing the amplitude of a wave form as a code group of $n$ pulses, means for storing a sample of instantaneous amplitude of said wave form, a source of potential, and output circuit and a network of $n$ resistors of ohmic values related as powers of two connected therebetween in series in the order of ascending ohmic values $n$ flip-flop circuits each comprising an off tube and an on tube, only the off tube of each circuit obtaining its plate potential from the end of the corresponding resistor remote from said source of potential, means for initially switching said flip-flop to the condition in which only the off tube is conductive, means for switching each of said flip-flop circuits in turn beginning with that associated with the resistor of the greatest ohmic value to the condition in which only the on tube is conductive, a source of reference voltage of amplitude equal to the total possible range acceptable by said coder, means for comparing the sum of the voltage of said output circuit and said sample voltage with said reference voltage and generating a pulse whenever said reference voltage is the smaller and means responsive to said pulse for switching the flip-flop circuit last actuated to the condition in which the off tube is drawing current.

5. A coder for expressing the amplitude of a wave form in binary code, each element of which represents a different portion of the total possible amplitude of said wave form, means for storing a sample of the instantaneous amplitude of said wave form, a flip-flop circuit for each element of said code controlling a voltage equal to the amplitude portion represented by said code element, a source of reference voltage equal to the total possible amplitude of said wave form, means for actuating each of said flip-flop circuits in turn to produce said voltages, means for comparing the sum of the outputs of said flip-flop circuits and the stored sample with said reference voltage after each flip-flop circuit is actuated, means for generating a code signal each time said sum exceeds said reference voltage and means operative each time a signal is generated to turn off the flip-flop circuit last actuated.

6. In a coder for expressing the amplitude of a wave form in binary code, each element of which represents a different portion of the total possible amplitude of said wave form, means for storing a sample of instantaneous amplitude of said wave form, a double stability circuit for each element of said code controlling a voltage equal to the amplitude portion represented by said code element, means for actuating each of said double stability circuits in turn to produce said voltages, a source of reference voltage equal to said total possible output, means for comparing the sum of the combined output of said double stability circuits and the stored sample with said reference voltage after each double stability circuit is actuated, means for generating a pulse each time said combined output exceeds said reference voltage and means operative each time a pulse is generated to switch to its other condition of stability the double stability circuit last actuated.

7. A multi-channel electronic system for converting amplitude modulated signals into binary code pulse indications, comprising a plurality of channels for providing pulses modulated from a given maximum amplitude in accordance with the respective instantaneous amplitude of an amplitude modulated audio signal, in each of said channels, means for combining the pulses of said channels into a train of pulses, means for providing a reference voltage having an initial value which is proportional to said given maximum amplitude, means for periodically comparing a given number of times for each amplitude modulated pulse, the relative amplitude of the voltages proportional to said reference and to each of said amplitude modulated pulses, means for periodically controlling the application of said reference and said pulse voltages to said comparing means, means for substantially equalizing in said comparing means said reference voltage and said pulse voltage in controlled periodical steps, means for producing a pulse code indication in response to the relative amplitude of said voltages for each of said periodical steps, and means for controlling the character of the equalization of said voltages or each step in accordance with the relative amplitude of said voltages during the preceding step.

ROBERT L. CARBREY.

No references cited.